US012664384B2

(12) United States Patent

Nakajima

(10) Patent No.: US 12,664,384 B2

(45) Date of Patent: Jun. 23, 2026

(54) INFORMATION PROCESSING APPARATUS, DISPLAY CONTROL METHOD, AND STORAGE MEDIUM

(71) Applicant: CANON KABUSHIKI KAISHA, Tokyo (JP)

(72) Inventor: Yuki Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/744,330

(22) Filed: Jun. 14, 2024

(65) Prior Publication Data

US 2024/0338539 A1 Oct. 10, 2024

Related U.S. Application Data

(63) Continuation of application No. 17/219,544, filed on Mar. 31, 2021, now abandoned.

(30) Foreign Application Priority Data

Apr. 3, 2020 (JP) ................................. 2020-067704

(51) Int. Cl.
| | |
|---|---|
| *G06K 7/10* | (2006.01) |
| *G06F 3/14* | (2006.01) |
| *G06K 19/07* | (2006.01) |

(52) U.S. Cl.
CPC ..... *G06K 7/10366* (2013.01); *G06K 19/0723* (2013.01); *G06F 3/14* (2013.01)

(58) Field of Classification Search
CPC ..... G01C 21/206; G01S 13/765; G01S 13/86; G01S 5/0284; G01S 5/0295; G01S 5/28; G01S 7/003; G06K 19/0723; G06K 7/10009; G06K 7/10366; G06F 3/14
See application file for complete search history.

(56) References Cited

U.S. PATENT DOCUMENTS

| | | | | |
|---|---|---|---|---|
| 2014/0179313 A1* | 6/2014 | Orton | ..................... | H04W 4/029 |
| | | | | 455/456.2 |
| 2016/0370454 A1* | 12/2016 | Raynesford | ............. | G01S 5/021 |
| 2018/0348359 A1* | 12/2018 | Wall | ......................... | G01S 13/84 |

\* cited by examiner

*Primary Examiner* — Omer S Khan

(74) *Attorney, Agent, or Firm* — Canon U.S.A., Inc. IP Division

(57) ABSTRACT

An information processing apparatus acquires identification information about a wireless device detected by a detection apparatus which detects wireless devices, detection clock time information about a clock time at which the detection apparatus has detected the wireless device, and movement amount information about a movement amount by which the detection apparatus has moved between an optional first clock time and an optional second clock time, determines, with use of the movement amount information and detection clock time information and identification information about each of a plurality of wireless devices, relative positions of the plurality of wireless devices, and causes a display unit to display information about the determined relative positions of the plurality of wireless devices.

6 Claims, 18 Drawing Sheets

DETECT RFID TAG 40a AT CLOCK TIME T1

DETECT RFID TAG 40a AT CLOCK TIME T2

DISPLAY PROBABILITY DISTRIBUTIONS

*80*

(p,q)
*81*

*14* DISPLAY UNIT

*81*

FIG.11
ID INFORMATION 41a
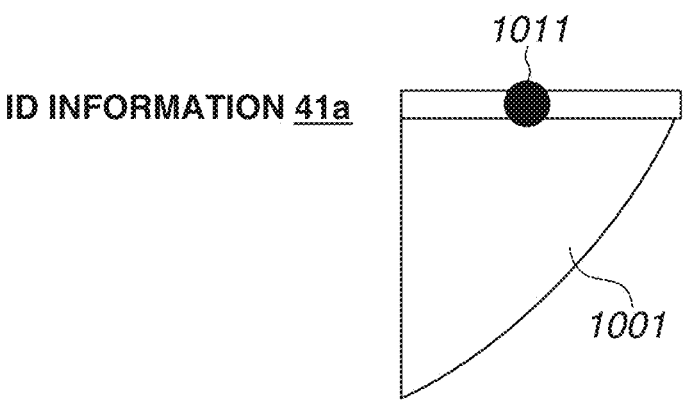
ID INFORMATION 41b
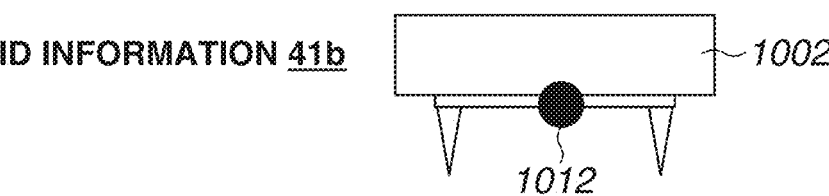
ID INFORMATION 41c
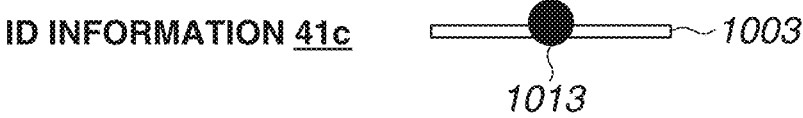

Figures 13A, 13B, 13C:
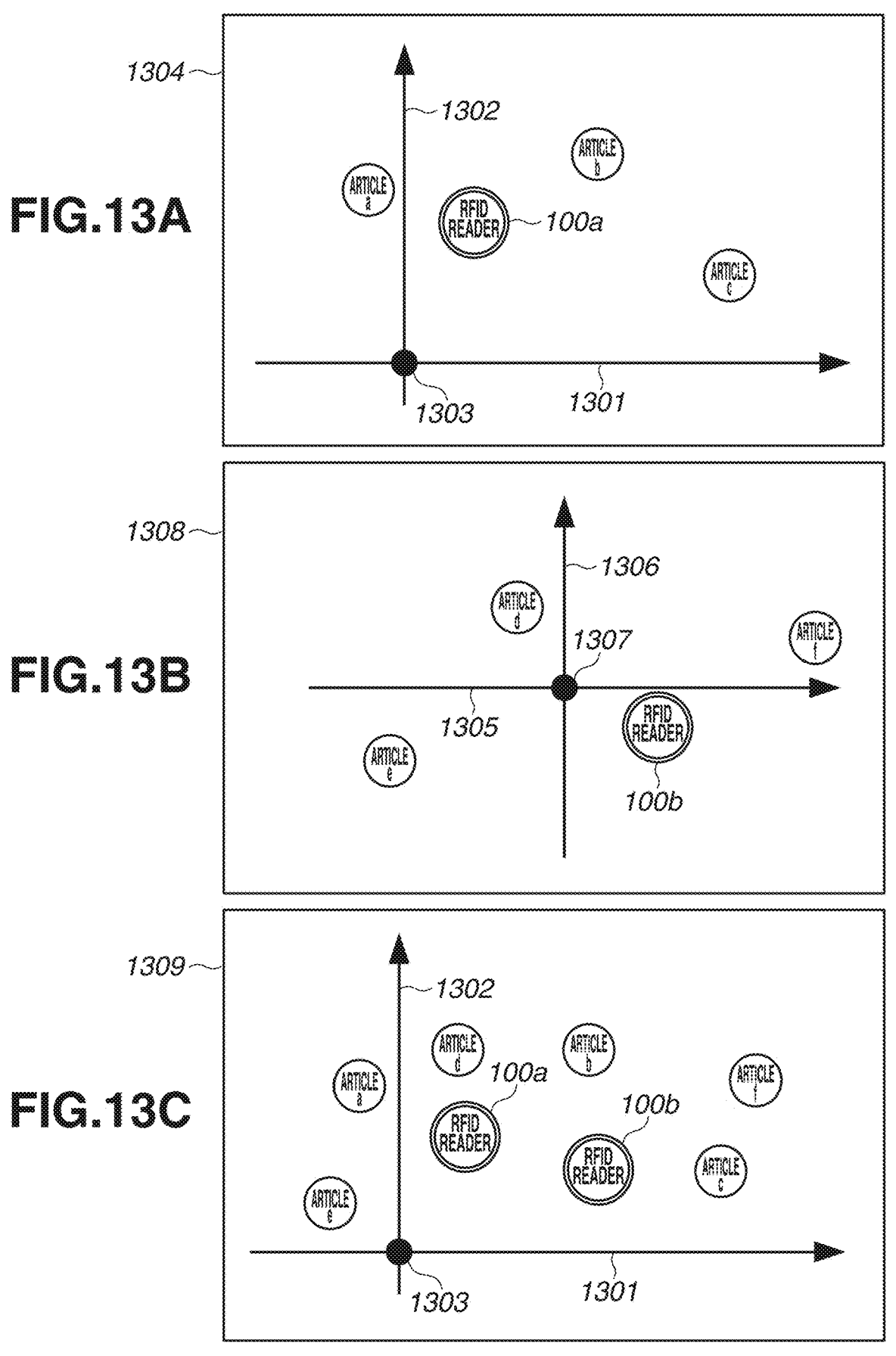

ARTICLE b

ARTICLE a

RFID READER — 100a

ARTICLE c 1303    1301

ARTICLE d

1307

ARTICLE f

1305

RFID READER — 100b

ARTICLE e

ARTICLE d    ARTICLE b

ARTICLE a    100a    100b    ARTICLE f

RFID READER    RFID READER

ARTICLE e    ARTICLE c 1303    1301

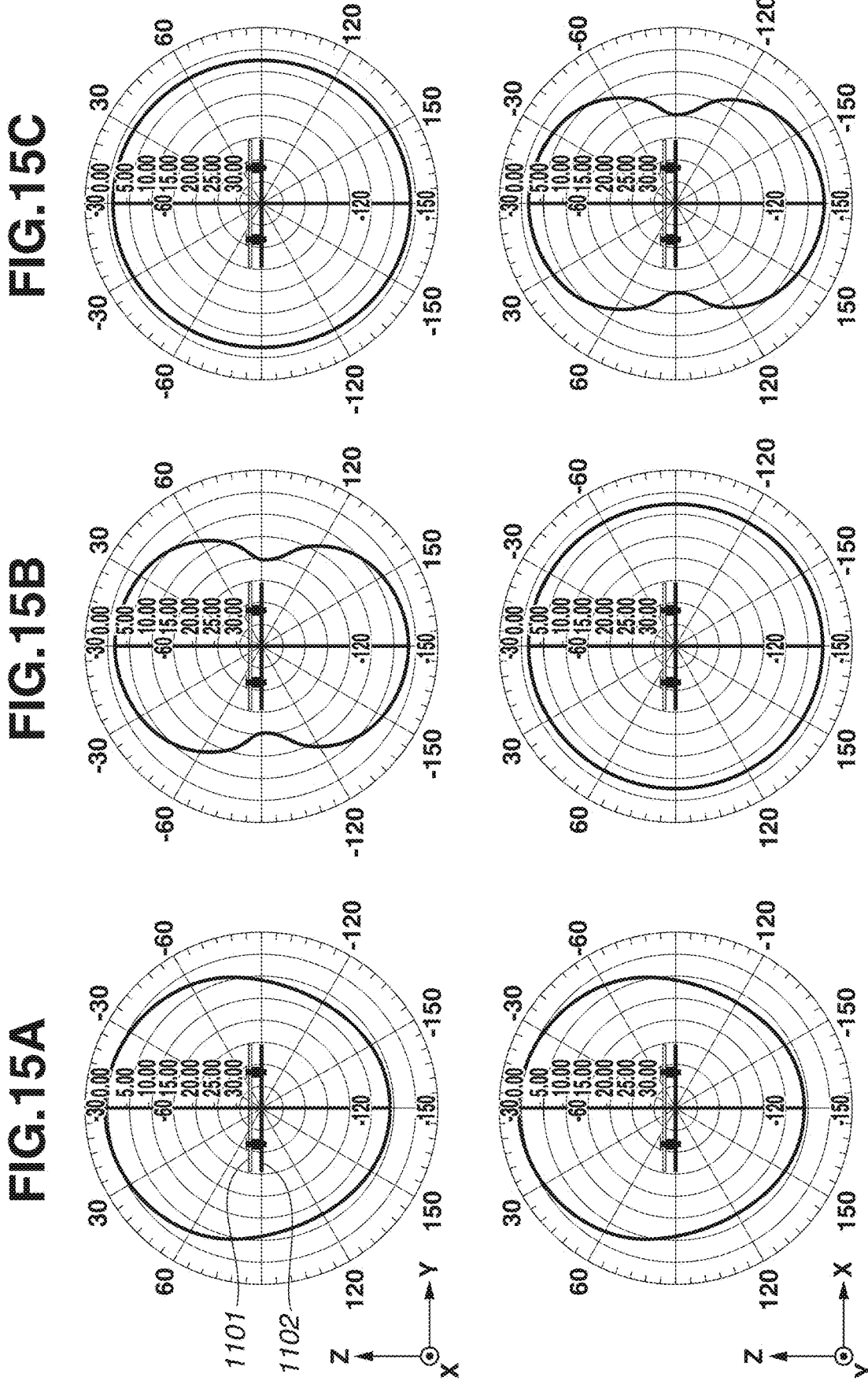

INFORMATION PROCESSING APPARATUS, DISPLAY CONTROL METHOD, AND STORAGE MEDIUM

CROSS REFERENCE OF RELATED APPLICATIONS

This application is a continuation of U.S. patent application Ser. No. 17/219,544 filed Mar. 31, 2021, which claims the benefit of Japanese Patent Application No. 2020-067704 filed Apr. 3, 2020, each of which is hereby incorporated by reference herein in its entirety.

BACKGROUND

Field

Aspects of the present disclosure generally relate to a technique for displaying positional information about a wireless device.

Description of the Related Art

In, for example, the management of logistics, stocktaking, and animals, there is used a system for managing, for example, articles or animals targeted for management with use of a ultra-high frequency (UHF) band passive radio-frequency identification (RFID) tag serving as a wireless device. The RFID tag receives radio waves (electromagnetic waves) radiated from the antenna of an RFID reader and operates with electric power generated from the received radio waves, and, therefore, has an advantage in requiring no battery and being able to be manufactured at low cost.

In light of the convenience of management and searching of articles, it is desirable that not only the presence or absence of an RFID tag is able to be detected but also the administrator is enabled to view positional information about each RFID tag. Japanese Patent Application Laid-Open No. 2004-294403 discusses an apparatus which not only detects an RFID tag with an RFID reader but also displays positional information about the detected RFID tag.

The method of displaying positional information about the detected RFID tag discussed in Japanese Patent Application Laid-Open No. 2004-294403 is a method of displaying positional information about an RFID tag which is present within a range in which the RFID tag is able to communicate with an RFID reader. Accordingly, the apparatus discussed in Japanese Patent Application Laid-Open No. 2004-294403 is not able to display positional information about an RFID tag which is present outside a range available for the RFID reader to perform communication.

SUMMARY

Various embodiments of the present disclosure enable displaying positional information about a wireless device which is far away in distance from a detection apparatus which detects wireless devices.

According to various embodiments of the present disclosure, an information processing apparatus includes an acquisition unit configured to acquire identification information about a wireless device detected by a detection apparatus which detects wireless devices, detection clock time information about a clock time at which the detection apparatus has detected the wireless device, and movement amount information about a movement amount by which the detection apparatus has moved between an optional first clock time and an optional second clock time, a determination unit configured to, with use of the movement amount information and detection clock time information and identification information about each of a plurality of wireless devices, determine relative positions of the plurality of wireless devices, and a display control unit configured to cause a display unit to display information about the relative positions of the plurality of wireless devices determined by the determination unit.

According to another embodiment of the present disclosure, an information processing apparatus includes an acquisition unit configured to acquire identification information about a wireless device detected by an apparatus which detects wireless devices, detection clock time information about a clock time at which the detection apparatus has detected the wireless device, movement amount information about a movement amount of the detection apparatus, and acquisition clock time information about a clock time at which the detection apparatus has acquired the movement amount information, a determination unit configured to, when an instruction for displaying positional information about the wireless device has been issued, determine a relative position of the wireless device relative to the detection apparatus based on the identification information, the detection clock time information, the movement amount information, and the acquisition clock time information acquired by the acquisition unit, and a display control unit configured to cause a display unit to display information about the relative position of the wireless device determined by the determination unit.

Further features of various embodiments of the present disclosure will become apparent from the following description of exemplary embodiments with reference to the attached drawings.

BRIEF DESCRIPTION OF THE DRAWINGS

FIGS. 4A, 4B, 4C, 4D, and 4E are diagrams illustrating display examples on a display unit according to the first exemplary embodiment.

FIG. 11 is an explanatory diagram illustrating article images stored in a database according to the third exemplary embodiment.

FIGS. 13A, 13B, and 13C are explanatory diagrams of a display method on the display unit according to the fourth exemplary embodiment.

FIGS. 15A, 15B, and 15C are diagrams illustrating radiation characteristics of the antenna unit.

DESCRIPTION OF THE EMBODIMENTS

In the following description, a method for managing positional information about a wireless device targeted for management according to various exemplary embodiments of the present disclosure is described in detail below with reference to the drawings. The management method in each exemplary embodiment detects each wireless device present in a wide range by causing a detection apparatus, which is able to detect wireless devices, to be conveyed by a moving object such as a person or a machine. Here, the wireless device is, for example, a radio-frequency identification (RFID) tag, and the detection apparatus is an RFID reader.

The method of causing the RFID reader to move includes, for example, a method in which a person or an animal carries the RFID reader while wearing the RFID reader and a method in which the RFID reader is attached to a machine such as a drone (unmanned aerial vehicle) or an unmanned transport vehicle. This enables causing the RFID reader to move over a wide range and thus detecting RFID tags which are present in a wide range. The RFID reader has the function of reading out identification (ID) information stored in a storage unit included in the RFID tag by supplying electromagnetic waves of the ultra-high frequency (UHF) band to the RFID tag and thus causing an integrated circuit (IC) chip mounted within the RFID tag to operate. Moreover, the RFID reader and the RFID tag are able to wirelessly communicate with each other at a distance of a few meters.

In each exemplary embodiment described herein, an RFID tag attached to an object of management such as a person or an animal is referred to as an "article RFID tag". The article RFID tag is used to, with use of ID information stored in the article RFID tag, identify an object of management with the article RFID tag attached thereto. Moreover, an RFID tag which serves as a reference for identifying the position of an article RFID tag is referred to as a "position RFID tag".

Furthermore, while, in the description of each exemplary embodiment described herein, an example in which an RFID tag is used as a wireless device serving as an object of detection and an RFID reader is used as a detection apparatus which detects wireless devices is explained, the wireless device and the detection apparatus are not limited to these. For example, instead of RFID, for example, a short-range wireless communication method, such as Near Field Communication (NFC) or Bluetooth®, or another type of wireless communication method can also be used. Alternatively, instead of RFID of the UHF band, RFID using another frequency band can also be used.

Figure 1:
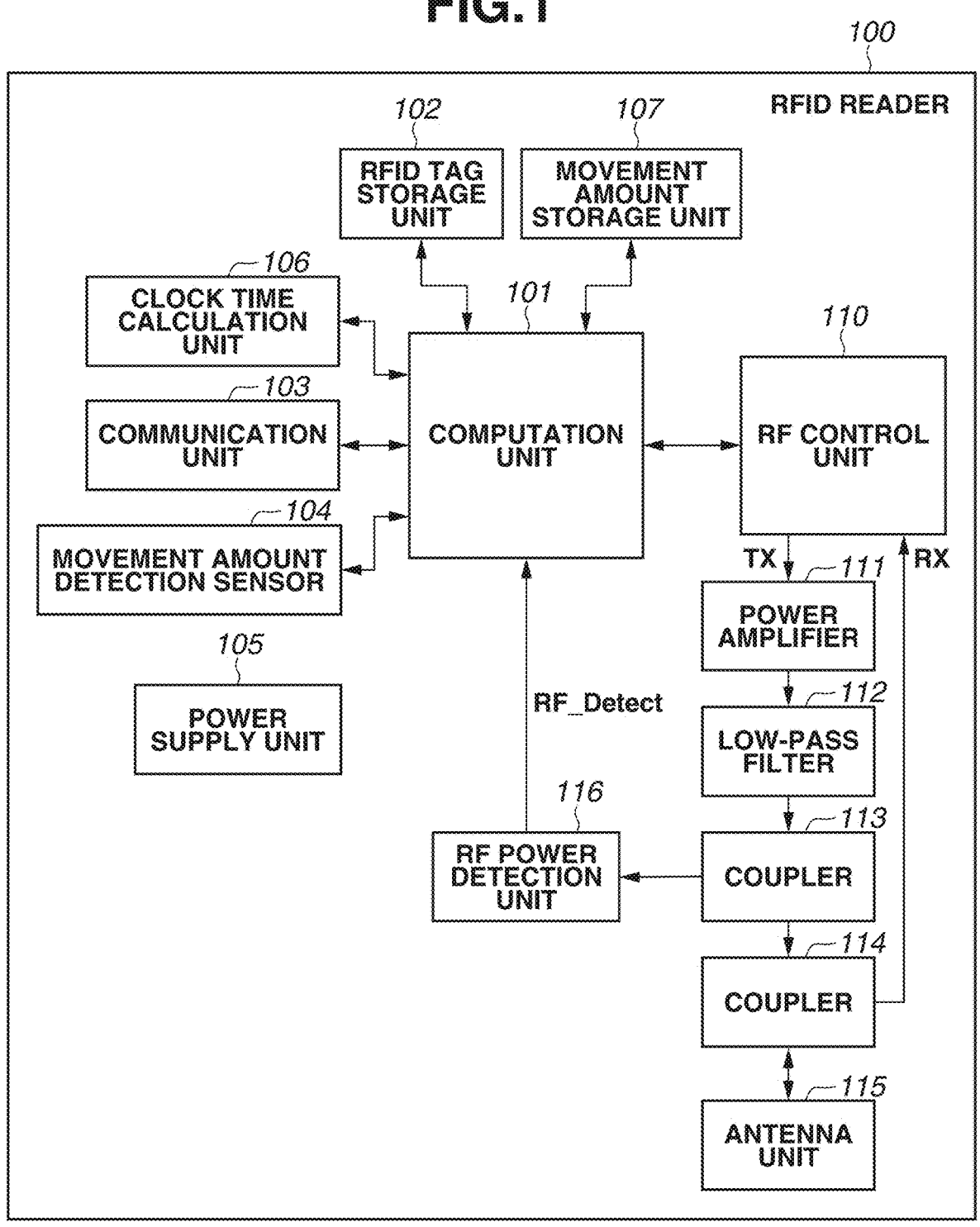
FIG. 1 is an explanatory diagram of a radio-frequency identification (RFID) reader.

FIG. 1 is a circuit block diagram of an RFID reader 100 which is used in a first exemplary embodiment.

The RFID reader 100 is controlled by a computation unit 101, which includes one or more processors, such as central processing units (CPUs), and a radio frequency (RF) control unit 110 outputs an RF output of the UHF band from a TX (transmission) terminal under the control of the computation unit 101. The RF output is amplified by a power amplifier 111 and, then, an unnecessary frequency band of the amplified RF output is cut off by a low-pass filter 112. Furthermore, electric power of the RF output is able to be set variable by the computation unit 101. A coupler 113 is used for an RF power detection unit 116 to detect the electric power. A result of detection of electric power performed by the RF power detection unit 116 is able to be detected as an RF_Detect signal by the computation unit 101. A coupler 114 is used to make a separation between an RF output which is to be output to an antenna unit 115 and an RF input which is received from the antenna unit 115. The antenna unit 115 is used to perform supply of electric power to an RFID tag to communicate with the RFID tag. A signal received from the antenna unit 115 is separated into an RF input by the coupler 114 and the RF input is received by the RF control unit 110 via an RX (reception) terminal, so that the RF control unit 110 is able to detect ID information, which is identification information about the RFID tag.

A power supply unit 105, which is composed of, for example, a battery and a direct current to direct current (DC-DC) converter, is a circuit used to supply a power-supply voltage to the RFID reader 100.

A movement amount detection sensor 104, which includes, for example, a three-axis accelerometer, gyroscope, or geomagnetic sensor, is a sensor which detects the movement amount of the RFID reader 100. The movement amount detection sensor 104 is used to detect information about relative positions between article RFID tags. Furthermore, the movement amount detection sensor 104 can be configured to use any technique as a detection method as long as the detection method is able to detect the movement distance and direction of an RFID tag. In the first exemplary embodiment, information including a combination of a movement distance and a movement direction (two-dimensional direction or three-dimensional direction) is assumed to be treated as a movement amount.

The computation unit 101 calculates a movement amount of the RFID reader 100 from the start of movement thereof with use of the movement amount detection sensor 104, and stores, in a movement amount storage unit 107, current clock time acquired from a clock time calculation unit 106 and the calculated movement amount of the RFID reader 100 at intervals of a predetermined time while associating the current clock time and the movement amount with each other.

The computation unit 101 acquires ID information about an RFID tag detected by the RF control unit 110, and stores, in an RFID tag storage unit 102, current clock time acquired from the clock time calculation unit 106 and a movement amount of the RFID reader 100 stored in the movement amount storage unit 107 while associating the current clock time and the movement amount with each other.

The computation unit 101 establishes a connection state with an information terminal 10, which is described below with reference to FIG. 2, via a communication unit 103. Then, the computation unit 101 performs appropriate data working and shaping on information stored in the RFID tag storage unit 102 and information stored in the movement amount storage unit 107 and transmits such processed information to the information terminal 10.

While, in the first exemplary embodiment, to acquire a movement amount, the movement amount detection sensor 104 incorporated in the RFID reader 100 is used, a configuration of, without using the movement amount detection sensor 104, using, for example, a sensor device independent of the RFID reader 100 to acquire a movement amount can be employed. In that case, the user carries the above-mentioned sensor device together with the RFID reader 100. Transmitting a movement amount detected by the sensor device to the computation unit 101 via a communication unit (not illustrated) also enables implementing a similar function. Particularly, that configuration is effective in a case where a sensor with a with a higher degree of accuracy than that of the movement amount detection sensor 104 is able to be separately prepared or in a case where the RFID reader 100 is manufactured in a smaller size and at lower cost.

Each of the RFID tag storage unit 102 and the movement amount storage unit 107 is configured with one or more memories, such as read-only memories (ROMs) or random access memories (RAMs), and the RFID tag storage unit 102 and the movement amount storage unit 107 can be configured with respective different memories or can be configured with a single memory and be managed with respective divided storage regions. The communication unit 103 is able to communicate with the information terminal 10 via wired communication using, for example, Ethernet or a Universal Serial Bus (USB) or wireless communication using, for example, a wireless local area network (LAN) or a public wireless method.

Figure 2:
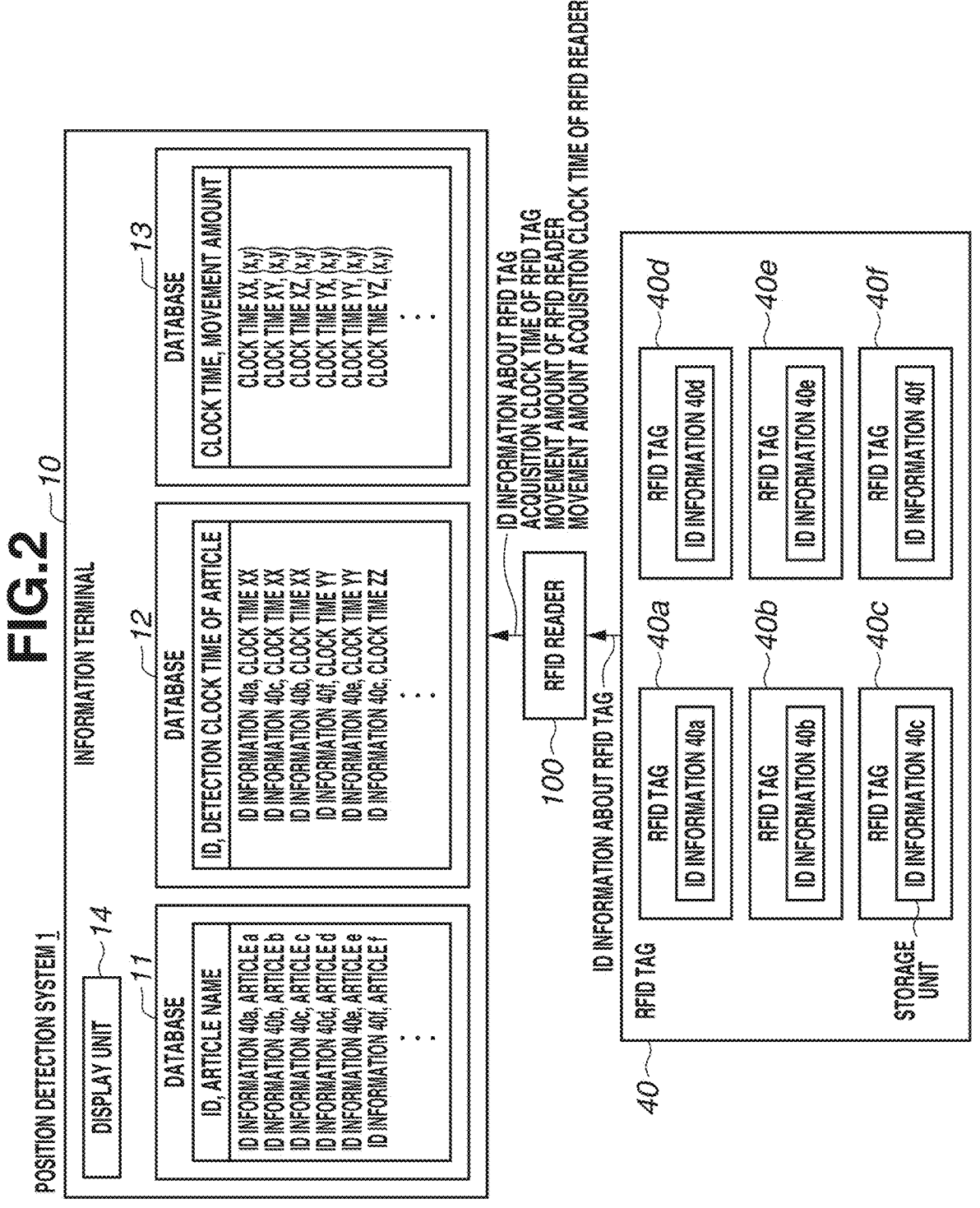
FIG. 2 is a configuration diagram of a position detection system according to a first exemplary embodiment.

FIG. 2 is a configuration diagram of a position detection system 1 in the first exemplary embodiment. As mentioned above, the RFID reader 100 transmits, to the information terminal 10, ID information about an RFID tag 40 and a clock time of acquisition (acquisition clock time) of the ID information and a movement amount of the RFID reader 100 and an acquisition clock time of the movement amount. Details of processing which the RFID reader 100 performs are described below with reference to FIG. 3.

The information terminal 10 is an information processing apparatus, such as a smartphone or a personal computer (PC), including a database 11, a database 12, a database 13, and a display unit 14.

The database 11 stores data in which ID information about the RFID tag 40 and the name of an article (article name) are associated with each other. Since direct ID information about the RFID tag 40 is difficult for the user to recognize, at the time of displaying information on the display unit 14, the ID information is converted into a name based on the database 11 and such a name is displayed. Without use of the database 11, ID information about the RFID tag 40 can also be directly displayed on the display unit 14.

The database 12 stores data in which ID information about the RFID tag 40 received from the RFID reader 100 and a clock time of detection (detection clock time) of the RFID tag 40 are associated with each other. The database 13 stores data in which a movement amount of the RFID reader 100 and a clock time of calculation of the movement amount are associated with each other and combinations of the movement amount and the clock time are arranged in chronological order.

The display unit 14 displays positional information about an article based on a user instruction issued via an interface (not illustrated) of the information terminal 10. A display method which is employed by the display unit 14 is described below with reference to FIGS. 5A, 5B, and 5C.

While, in the first exemplary embodiment, a configuration in which the database 11, the database 12, and the database 13 are built within the information terminal 10 is employed, such databases can be built in a data server which is present independent of the information terminal 10. In that case, a configuration in which the information terminal 10 accesses the data server as needed to acquire necessary information can be employed. Moreover, a configuration in which the display unit 14 is included in a display apparatus different from the information terminal 10 can also be employed. In that case, the information terminal 10 performs display control to transmit, to the display apparatus, information which the display unit 14 is caused to display, thus causing the display apparatus to display positional information about an article.

Figure 17:
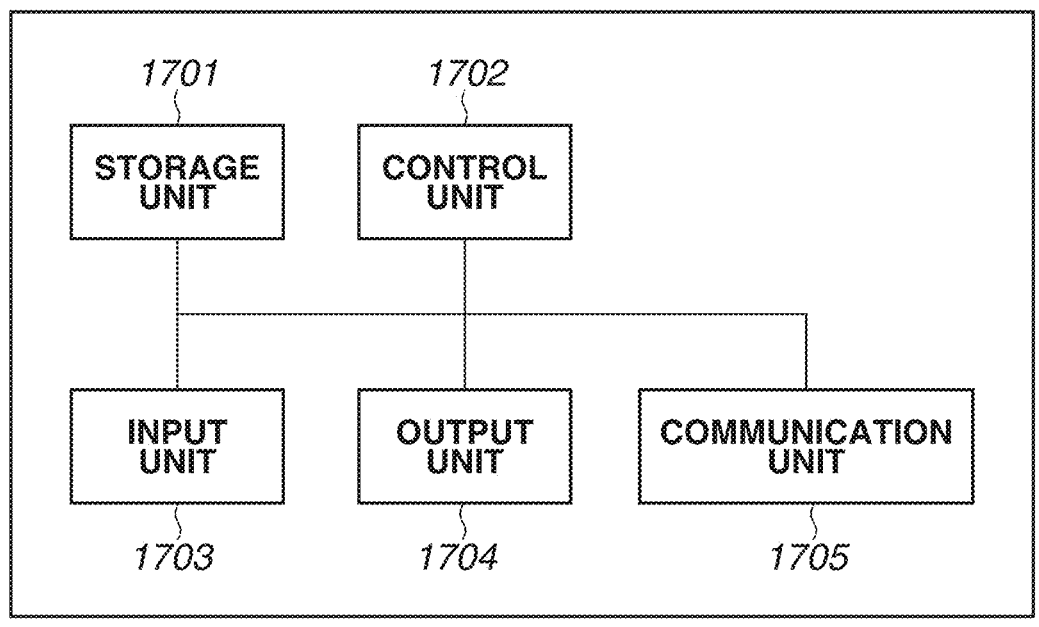
FIG. 17 is a hardware block diagram of the information terminal in the first exemplary embodiment.

FIG. 17 illustrates a hardware configuration of the information terminal 10 in the first exemplary embodiment.

A storage unit 1701 is configured with one or more memories, such as a combination of or any one of a ROM and a RAM, and stores programs for performing various operations described below and various databases described above or described below. Furthermore, examples of the storage unit 1701 can include, in addition to memories such as a ROM and a RAM, various storage media, such as a flexible disc, a hard disk, an optical disc, a magnetooptical disc, a compact disc (CD)-ROM, a CD-R, a magnetic tape, a non-volatile memory card, and a digital versatile disc (DVD).

A control unit 1702 is configured with, for example, one or more processors such as a central processing units (CPUs) or micro processing units (MPUs), an application specific integrated circuit (ASIC), a digital signal processor (DSP), or a field-programmable gate array (FPGA). The control unit 1702 controls the entire information terminal 10 by executing programs stored in the storage unit 1701.

An input unit 1703 receives various operations performed by the user. An output unit 1704 supplies various outputs to the user. Here, the outputs which are supplied by the output unit 1704 include at least one of, for example, displaying on a screen, an audio output from a loudspeaker, and a vibration output. Accordingly, the output unit 1704 includes the display unit 14 illustrated in FIG. 2. Furthermore, a configuration in which both the input unit 1703 and the output unit 1704 are implemented by a single module as with a touch panel can be employed. A communication unit 1705 is able to perform wired or wireless communication, and the information terminal 10 is able to communicate with an RFID reader via the communication unit 1705. The information terminal 10 is an information processing apparatus such as a PC, a smartphone, or a server.

Figure 3:
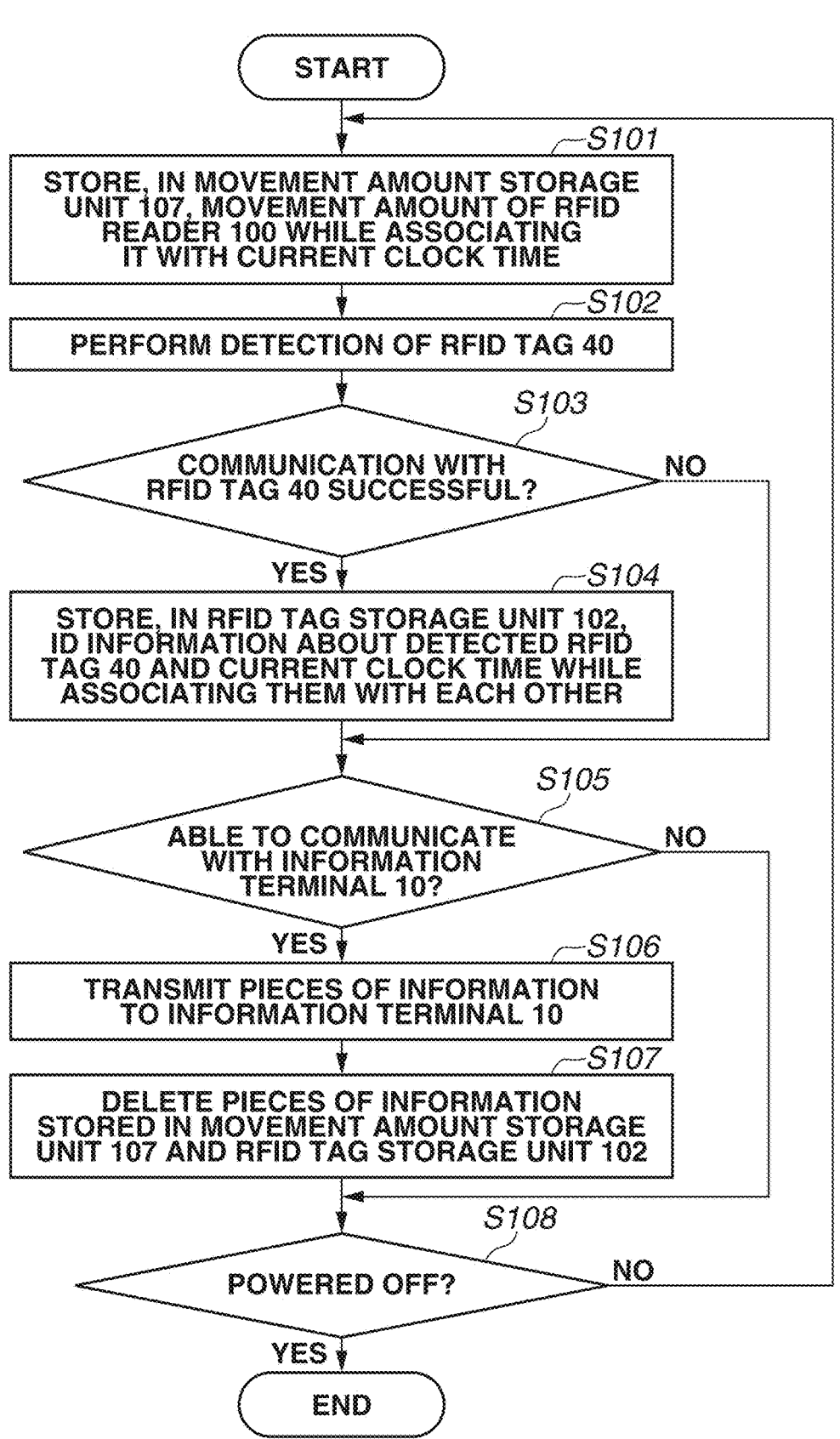
FIG. 3 is a control flowchart for the RFID reader according to the first exemplary embodiment.

FIG. 3 is a flowchart illustrating processing which the RFID reader 100 in the first exemplary embodiment performs when performing an RFID tag detecting operation. Processing in each step illustrated in FIG. 3 is implemented by the computation unit 101 of the RFID reader 100 executing a program stored in a storage unit included in the RFID reader 100.

When being powered on, the RFID reader 100 starts a control operation for detecting positional information about an article. In step S101, the RFID reader 100 acquires a cumulative movement amount of the RFID reader 100 obtained from the start of the control operation based on a detection result provided by the movement amount detection sensor 104. Then, the RFID reader 100 stores, in the movement amount storage unit 107, the acquired cumulative movement amount together with a current clock time calculated by the clock time calculation unit 106, i.e., acquisition clock time information about a clock time at which the cumulative movement amount has been acquired. Each of the movement amount and the cumulative movement amount used herein is vector information including pieces of information about a direction and a distance.

In step S102, to communicate with the RFID tag 40, the RFID reader 100 starts control to periodically cause the RF control unit 110 to operate to perform communication with the RFID tag 40. In step S103, the RFID reader 100 determines whether a communication with the RFID tag 40 is successful and ID information, which is identification information about the RFID tag 40, has been acquired. If it is determined that ID information about the RFID tag 40 has been acquired (YES in step S103), the RFID reader 100 advances the processing to step S104. If it is determined that ID information about the RFID tag 40 has not been acquired (NO in step S103), the RFID reader 100 advances the processing to step S105.

In step S104, the RFID reader 100 stores, in the RFID tag storage unit 102, the acquired ID information and a current clock time calculated by the clock time calculation unit 106, i.e., a detection clock time which is a clock time at which the RFID tag 40 has been detected while associating the acquired ID information and the calculated current clock time with each other.

In step S105, the RFID reader 100 determines whether the RFID reader 100 is able to communicate with the information terminal 10 via the communication unit 103. If it is determined that the RFID reader 100 is able to communicate with the information terminal 10 (YES in step S105), the RFID reader 100 advances the processing to step S106, and, if it is determined that the RFID reader 100 is not able to communicate with the information terminal 10 (NO in step S105), the RFID reader 100 advances the processing to step S108.

In step S106, the RFID reader 100 transmits, to the information terminal 10, pieces of information stored in the RFID tag storage unit 102 and the movement amount storage unit 107. In the movement amount storage unit 107, there are stored movement amount information, which indicates a movement amount of the RFID reader 100 stored in step S101, and acquisition clock time information, which indicates a clock time at which the movement amount has been acquired. Moreover, in the RFID tag storage unit 102, there are stored identification information about the RFID tag 40 stored in step S104 and detection clock time information, which indicates a clock time at which the RFID tag 40 has been detected. In step S106, these four pieces of information are transmitted to the information terminal 10. In step S107, the RFID reader 100 deletes the pieces of information stored in the RFID tag storage unit 102 and the movement amount storage unit 107 which have been transmitted to the information terminal 10, thus deallocating a memory region of the RFID reader 100, and then advances the processing to step S108.

In step S108, the RFID reader 100 determines whether an operation for powering off has been performed on the RFID reader 100. If it is determined that the operation for powering off has been performed (YES in step S108), the RFID reader 100 ends control for detecting positional information about an article. If it is determined that the operation for powering off has not been performed (NO in step S108), the RFID reader 100 returns the processing to step S101, thus continuing the control. Furthermore, processing in step S108 can be not detection of powering off but determination of the presence or absence of an instruction for ending the processing illustrated in the flowchart of FIG. 3.

With the above-described control being performed, the computation unit 101 of the RFID reader 100 performs control to automatically detect detection information about the RFID tag 40 attached to an article targeted for management and movement amount information about the RFID reader 100 and then transmit the detected detection information and movement amount information to the information terminal 10.

FIGS. 4A, 4B, 4C, 4D, and 4E illustrate a method of displaying, on the display unit 14 of the information terminal 10, positional information about articles based on information stored in the databases 11, 12, and 13.

Figures 4A, 4B, 4C:
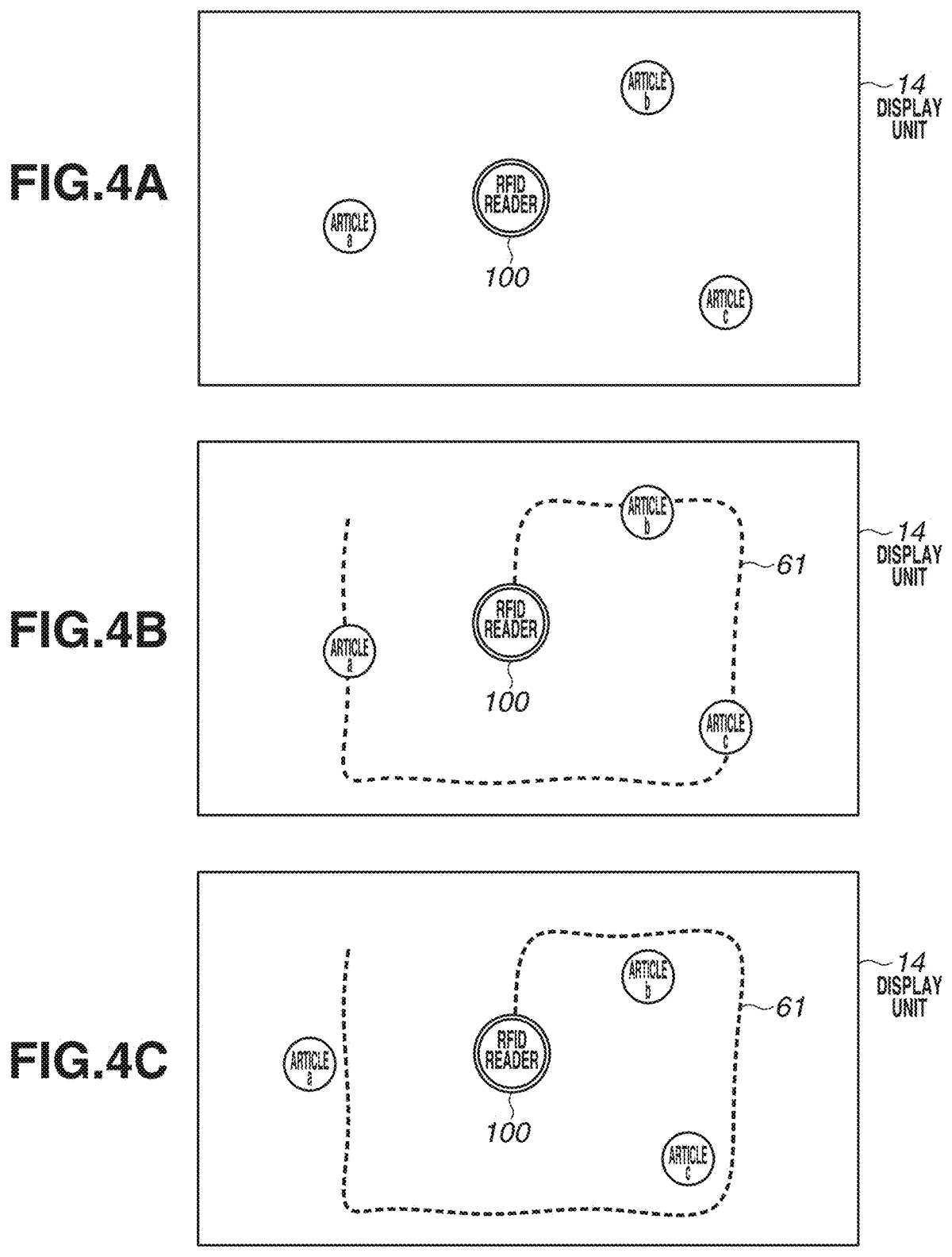

FIG. 4A illustrates an example in which the current position of the RFID reader 100 and detection positions of the detected RFID tags 40 are displayed together on the display unit 14. On the display unit 14, the current position of the RFID reader 100 is displayed as a double-line circle, the position of each RFID tag 40 is displayed as a single-line circle, and the name of an RFID tag 40 which is referred to by an ID in the database 11 is displayed in the center of the single-line circle. In the example illustrated in FIG. 4A, a layout is made in such a manner that the current position of the RFID reader 100 accords with the center of the display unit 14.

Figure 16:
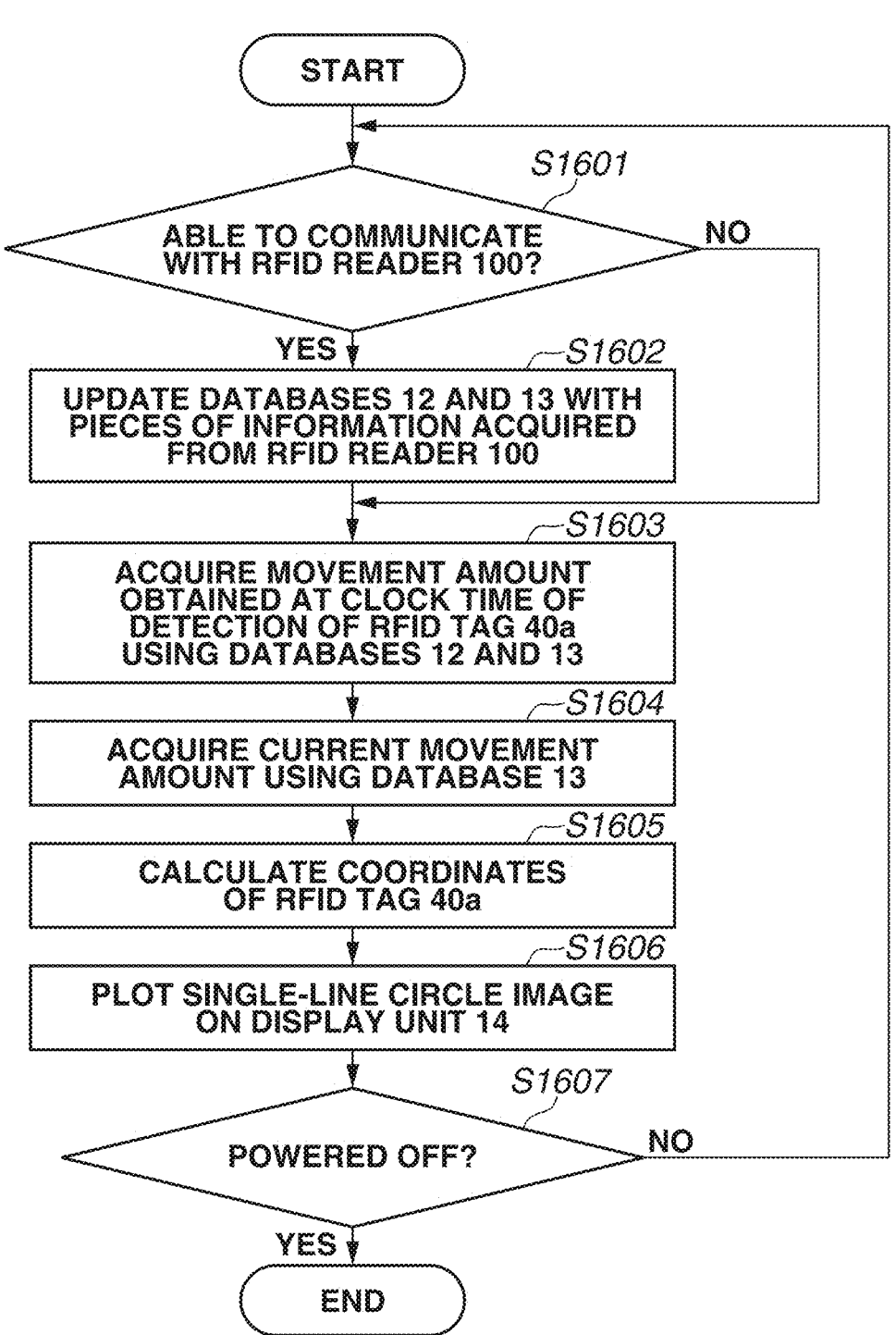
FIG. 16 is a flowchart for an information terminal in the first exemplary embodiment.

Next, processing which the information terminal 10 performs to display positional information about the RFID tag 40 on the display unit 14 is described with reference to the flowchart of FIG. 16. Steps in the flowchart of FIG. 16 are implemented by the control unit 1702 of the information terminal 10 executing a program stored in the storage unit 1701. Furthermore, while, in the description about FIG. 16, an RFID tag 40a is set as a target for displaying, similar processing can also be performed with respect to the other RFID tags 40.

In step S1601, the information terminal 10 determines whether the information terminal 10 is able to communicate with the RFID reader 100. If it is determined that the information terminal 10 is able to communicate with the RFID reader 100 (YES in step S1601), the information terminal 10 advances the processing to step S1602, and, if it is determined that the information terminal 10 is not able to communicate with the RFID reader 100 (NO in step S1601), the information terminal 10 advances the processing to step S1603. In step S1602, the information terminal 10 acquires pieces of information from the RFID reader 100 and updates the database 12 and the database 13 based on the acquired pieces of information. The pieces of information which are acquired from the RFID reader 100 are pieces of information transmitted from the RFID reader 100 in step S106 illustrated in FIG. 3. Specifically, such pieces of information include movement amount information, which indicates a movement amount of the RFID reader 100, acquisition clock time information, which indicates a clock time at which the movement amount has been acquired, identification information about the detected RFID tag 40, and detection clock time information, which indicates a clock time at which the detected RFID tag 40 has been detected.

In step S1603, in a case where detection information about the RFID tag 40a is currently recorded in the database 12, the information terminal 10 acquires, from the database 13, a movement amount of the RFID reader 100 obtained at the same clock time as the detection clock time of the RFID tag 40a. In a case where information about a movement amount of the RFID reader 100 obtained at the same clock time is not currently recorded in the database 13, the information terminal 10 acquires a movement amount of the RFID reader 100 at a clock time closest to the detection clock time of the RFID tag 40a from among pieces of clock time information recorded in the database 13. This movement amount is referred to as a "detection clock time movement amount".

In step S1604, the information terminal 10 acquires, from the database 13, a movement amount of the RFID reader 100 the movement amount calculation time clock of which is the latest. This movement amount is referred to as a "current movement amount". In step S1605, the information terminal 10 calculates coordinates of the RFID tag 40a. Here, the information terminal 10 calculates a difference between the detection clock time movement amount of the RFID tag 40a acquired in step S1603 and the current movement amount acquired in step S1604. This enables calculating coordinates of the RFID tag 40a in a planar space centering on the current position of the RFID reader 100.

In step S1606, the information terminal 10 performs appropriate conversion of the calculated coordinates of the RFID tag 40a in conformance with a display coordinate system of the display unit 14 to plot a single-line circle image. With this processing, the information terminal 10 performs display control in such a manner that positional information about the detected RFID tag 40a, i.e., relative position information about the RFID tag 40a that is based on the position of the RFID reader 100, is displayed on the display unit 14. Furthermore, it is favorable that the relative position information is displayed on the display unit 14 not as an RFID tag but as the name of an article with the RFID tag attached thereto, i.e., the name of an article associated with ID information about the RFID tag in the database 11. In step S1607, the information terminal 10 determines whether an operation for powering off has been performed on the information terminal 10. If it is determined that the operation for powering off has been performed (YES in step S1607), the information terminal 10 ends control for displaying positional information about an article. If it is determined that the operation for powering off has not been performed (NO in step S1607), the information terminal 10 advances the processing to step S1601, thus continuing the control. Furthermore, processing in step S1607 can be not detection of powering off but determination of the presence or absence of an instruction for ending the processing illustrated in the flowchart of FIG. 16.

With the above-described control being performed, the information terminal 10 is able to display the current position of the RFID reader 100 and the detection position of the detected RFID tag 40 together on the display unit 14, as illustrated in FIG. 4A. In a case where a plurality of pieces of detection information about the RFID tag 40a is currently stored in the database 12, the display position of the RFID tag 40a can be determined by, for example, using the latest detection information. Furthermore, various pieces of necessary information, such as relative positions and pieces of positional information, are not necessarily limited to the ones calculated by computation but only need to be determined by any method included in the other methods. For example, a method of previously storing calculation results as a table and acquiring, from the acquired various values, a result corresponding to the acquired various values from the table, thus obtaining necessary information such as a relative position and positional information, can be employed. This also applies to all of the portions which are configured to be obtained by computation in subsequent descriptions.

FIG. 4B illustrates an example in which the current position of the RFID reader 100, the detection positions of the RFID tags 40, and a trajectory along which the RFID reader 100 has moved are displayed together on the display unit 14. A dashed line indicates a trajectory 61 of the RFID reader 100 in the first exemplary embodiment. The current position of the RFID reader 100 and the detection positions of the RFID tags 40 are similar to those described with reference to FIG. 4A. In the following description, a method of displaying the trajectory 61 on the display unit 14 is described. Calculating a difference between a past movement amount of the RFID reader 100 and the current movement amount thereof by referring to the database 13 enables acquiring past coordinates at which the RFID reader 100 was present in the past. Acquiring a plurality of past coordinates obtained in the above-mentioned way and then plotting a line segment obtained by interconnecting adjacent past coordinates on the display unit 14 enables displaying the trajectory 61.

FIG. 4C illustrates an example in which the detection position of the RFID tag 40 illustrated in FIG. 4B is corrected and the corrected detection position is displayed on the display unit 14. In a case where the communication available distance of the RFID reader 100 is sufficiently larger than the resolution of movement amount detection, estimating the distance and direction of the RFID tag 40 with respect to the RFID reader 100 and correcting the detection position enables more accurately displaying the position of the RFID tag 40. For example, a configuration of estimating a distance and a direction with respect to a communication target using, for example, radio wave transmission and reception intensities and radio wave phases stored in the RF control unit 110 can be employed. Such a configuration can record the distance and direction estimated in the above-mentioned way on a database (not illustrated) included in the information terminal 10 and use the recorded distance and direction for correction of the detection position.

Figures 4D, 4E:
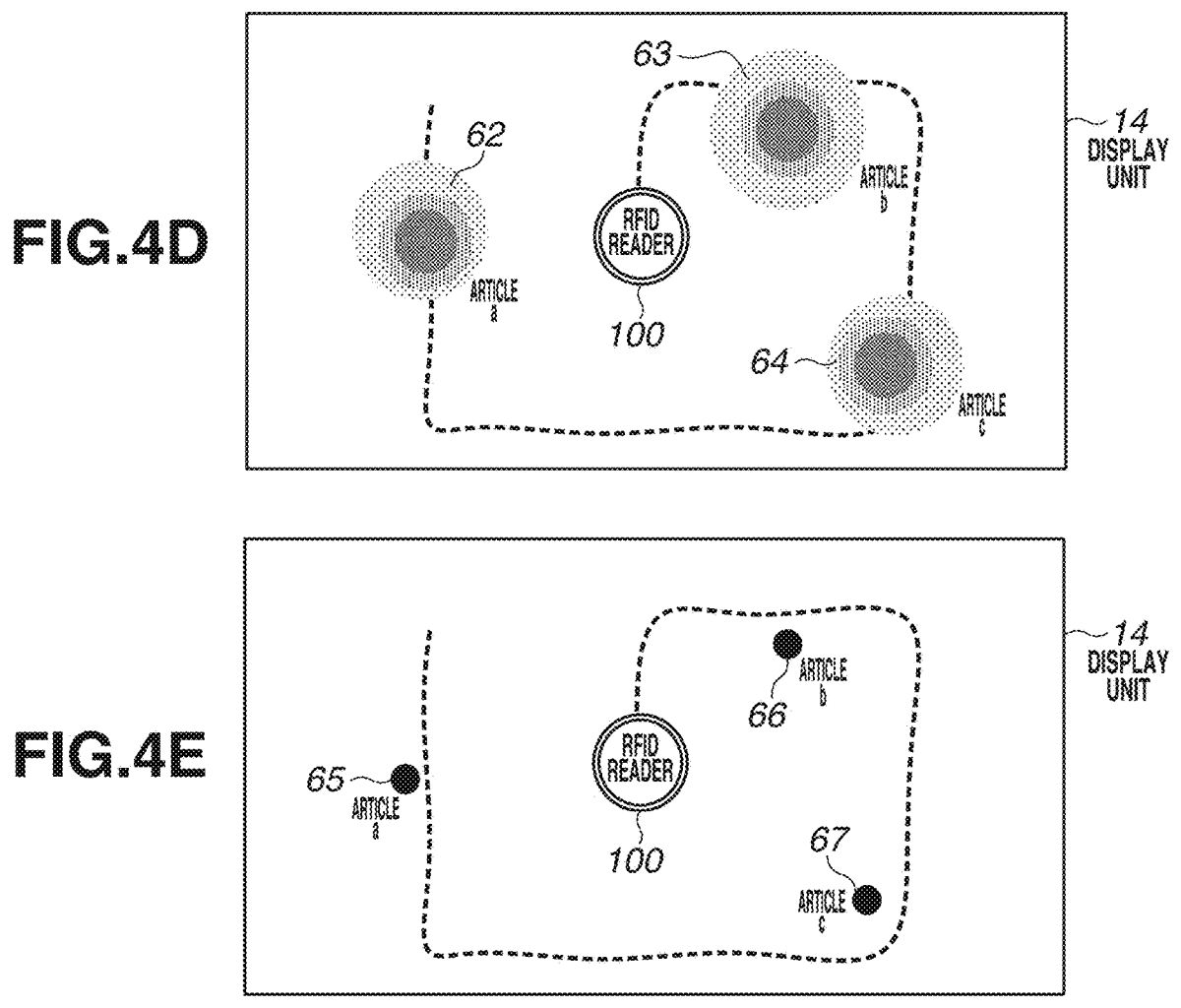

FIG. 4D illustrates an example in which the current position of the RFID reader 100, a trajectory along which the RFID reader 100 has moved, and existence probability distributions 62, 63, and 64 of the RFID tag 40 are displayed together on the display unit 14. Instead of performing estimation of a distance and a direction described with reference to FIG. 4C, the RFID reader 100 can also detect the same RFID tag 40 at different positions a plurality of times, integrate pieces of information obtained by such a detection, and estimate the position of the RFID tag 40. In the following description, a method of displaying a result obtained by estimating the position of the RFID tag 40 as a probability distribution is described.

Figure 5A:
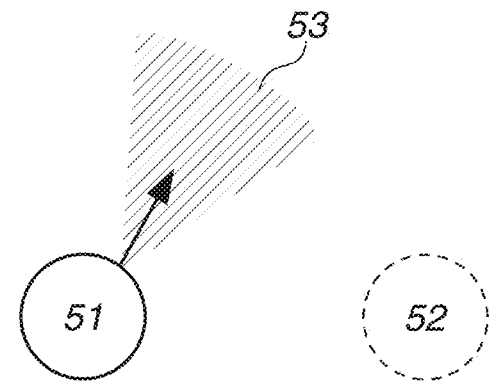
FIGS. 5A, 5B, and 5C are explanatory diagrams of a probability distribution display method according to the first exemplary embodiment.
Figure 5B:
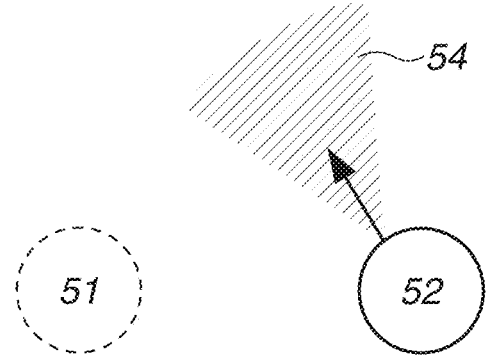

An example of a method of generating a probability distribution in the first exemplary embodiment is described with reference to FIGS. 5A to 5C. FIG. 5A illustrates a detection range 53 of the RFID reader 100 obtained at a clock time T1 at which the RFID reader 100 has detected the RFID tag 40a. A circle 51 indicates the position of the RFID reader 100 obtained at the time clock T1, and an arrow indicates the orientation of the RFID reader 100 obtained at the same time. While the orientation of the RFID reader 100 is able to be obtained by differentiating movement amounts obtained before and after the clock time T1 stored in the database 13, the direction of the RFID reader 100 is also able to be directly detected by using the movement amount detection sensor 104. The detection range 53 is estimated from the position and orientation of the RFID reader 100 obtained at the clock time T1 and the radio field intensity. FIG. 5B illustrates a detection range 54 obtained at a clock time T2 at which the RFID reader 100 has detected the RFID tag 40a. A circle 52 indicates the position of the RFID reader 100 obtained at the time clock T2, and the detection range 54 is estimated from the position and orientation of the RFID reader 100 obtained at the clock time T2 and the radio field intensity.

Figure 5C:
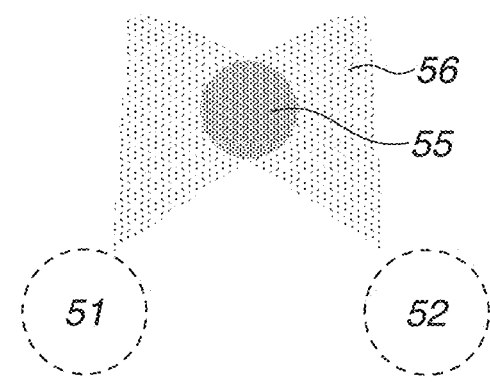

FIG. 5C illustrates probability distribution indications 55 and 56 estimated from the detection ranges obtained at the clock time T1 and the clock time T2. A portion at which the detection range 53 and the detection range 54 overlap each other is determined to have a high probability in which the RFID tag 40*a* exists and is, therefore, displayed at high density as the indication 55, and portions at which such overlapping does not occur are displayed at low density as the display 56. While, in the description regarding FIGS. 5A to 5C, an example of displaying of probability distributions estimated from two detection ranges has been described, the number of detection ranges for use in estimation can be larger than two. As the number of detection ranges is larger, an estimation with a higher accuracy becomes possible. Moreover, although not described in the first exemplary embodiment, additionally using other parameters, such as radio wave characteristics and operation conditions, for detection range generation or probability distribution estimation enables further increasing accuracy. For example, in consideration of directivity differing depending on whether the output radio waves of the RFID reader 100 are circularly polarized waves or linearly polarized waves, the shape of a detection range can be varied. Alternatively, varying the size of a detection range according to the received radio wave intensity obtained at the time of communication with the RFID tag 40 enables performing probability estimation with high accuracy.

Displaying the probability distribution of the RFID tag 40 generated in the above-mentioned way and the current position of the RFID reader 100 and the trajectory along which the RFID reader 100 has moved, described with reference to FIGS. 4A and 4B, together enables displaying the existence probability distributions 62, 63, and 64 illustrated in FIG. 4D on the display unit 14.

Moreover, as illustrated in FIG. 4E, a point 65, a point 66, and a point 67, which are coordinate points highest in existence probability out of the respective regions of existence probability distributions 62, 63, and 64, are able to be displayed on the display unit 14. Such a display method enables plotting the estimated position of the RFID tag 40 as one point as illustrated in FIGS. 4A to 4C.

While, in FIGS. 4A to 4E, the RFID reader 100 is displayed on the display unit 14 in such a manner that the current position of the RFID reader 100 accords with the center of the display unit 14, the first exemplary embodiment is not limited to this. Moreover, configuring a system in such a manner that the information terminal 10 is able to, for example, change display marks or display names or change the scale size of a display coordinate system enables providing a more convenient environment to the user.

In the system configuration described in the first exemplary embodiment, it is possible to update a detection result every time the RFID reader 100 moves and communicates with the RFID tag 40 and then dynamically reflect the updated detection result in the display unit 14. Therefore, the user is enabled to know a halfway progress from the display unit 14 without detection of all of the RFID tags 40 and to know the latest information in addition to information additionally detected later.

Moreover, even if RFID tags 40 are scattered in a wide range exceeding a communication available region of the RFID reader 100, such a characteristic that the RFID reader 100 detects RFID tags 40 while moving enables acquiring a relative positional relationship between RFID tags 40. With this configuration, even if an RFID reader and an RFID tag are away in distance from each other or RFID tags are away in distance from each other, it is possible to make such pieces of positional information visible irrespective of an existence range of RFID tags.

With the above-described characteristics, in addition to a conventional manner of operation of attaching an RFID tag 40 to a management target article and performing identification of articles or checking of the presence or absence of an article, it is possible to make an article search route visible or make the presence of an article visible. Additionally, it is possible to obtain an advantageous effect of, for example, performing real-time information updating responding to changing of the presence of an article with time. As a result, the first exemplary embodiment is characterized in being able to enhance traceability of an article than ever before.

Figure 6:
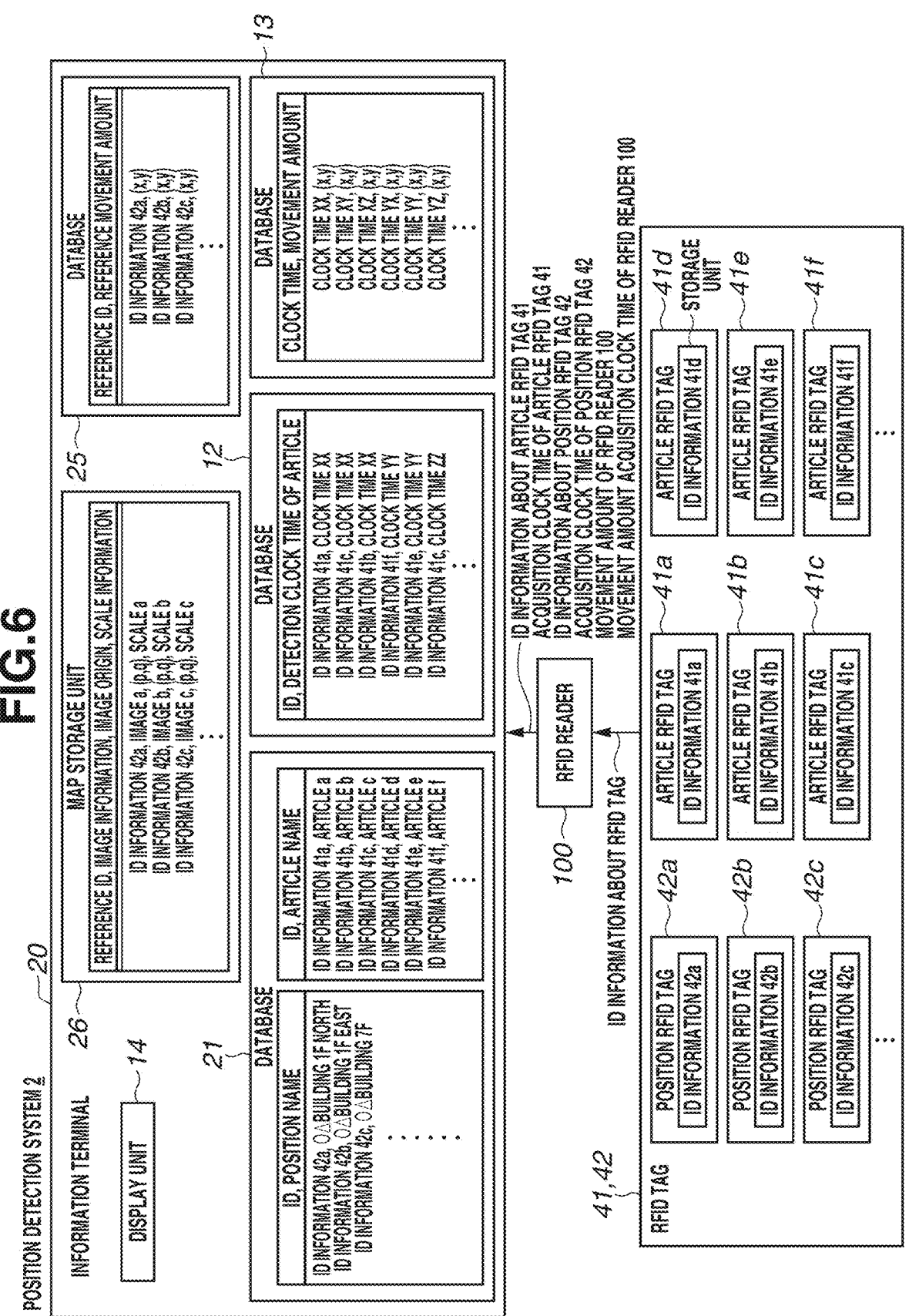
FIG. 6 is a configuration diagram of a position detection system according to a second exemplary embodiment.

FIG. 6 is a configuration diagram of a position detection system 2 in a second exemplary embodiment. The second exemplary embodiment differs from the first exemplary embodiment in that a reference position is additionally provided and a relative position from the reference position is calculated and used based on the movement amount of the RFID reader 100. Furthermore, constituent elements similar to those of the first exemplary embodiment are assigned the respective same reference characters as those in the first exemplary embodiment and are omitted from description here.

In the second exemplary embodiment, the RFID reader 100 transmits, to an information terminal 20, ID information about an article RFID tag 41, an acquisition clock time of the article RFID tag 41, ID information about a position RFID tag 42, an acquisition clock time of the position RFID tag 42, a movement amount of the RFID reader 100, and an acquisition clock time of the movement amount of the RFID reader 100. The position RFID tag 42 is an RFID tag which is fixed and set at a predetermined position to indicate a reference position and is used for operation, and is differentiated from the article RFID tag 41 in the system of the second exemplary embodiment. However, in the RFID reader 100, the same data processing as the processing to be performed on the RFID tag 40 described in the first exemplary embodiment is performed on the article RFID tag 41 and the position RFID tag 42.

The information terminal 20 is an information processing apparatus, such as a smartphone or a PC, including a database 21, a database 12, a database 13, a database 25, a map storage unit 26, and a display unit 14. A hardware configuration of the information terminal 20 is similar to that of the information terminal 10 described in the first exemplary embodiment.

The database 21 stores data in which ID information about the article RFID tag 41 and a name thereof and ID information about the position RFID tag 42 and a name thereof are associated with each other. The database 25 stores reference position information for use in the position detection system 2. The reference position information is information in which a reference ID and a reference movement amount are associated with each other. The reference ID is an ID of an RFID tag which is set at the reference position. In the second exemplary embodiment, the reference ID to be used includes ID information 42 (42*a*, 42*b*, 42*c*) about the position RFID tag 42. The reference movement amount is a movement amount by which the RFID reader 100 has moved until arriving at the reference position. When ID information which the information terminal 20 has received from the RFID reader 100 matches ID information recorded in the reference ID, the information terminal 20 stores, as the reference movement amount, a movement amount of the RFID reader 100 which the information terminal 20 has received at the same time. In the second exemplary embodiment, the movement amount of the RFID reader 100 obtained until any one of position RFID tags 42 is detected is stored as the reference movement amount. Thus, the reference movement amount is a value which is determined and changed while the position detection system 2 is being operated.

The map storage unit 26 stores map information obtained within an operation range of the position detection system 2. The map information is information in which ID information, image information, an image origin, and scale information are associated with each other. The ID information is an ID of an RFID tag which is set at the reference position, i.e., ID information about the position RFID tag 42. The image origin is coordinates which indicate where the above-mentioned reference position is present on an image. For example, in a case where the image origin indicates (0, 0), the image origin means that the reference position is present at the upper left corner of the image. These pieces of map information are determined before the operation of the position detection system 2, and are stored in the map storage unit 26 to be used. A configuration in which the map information is periodically downloaded from, for example, an external server and is updated to the latest information can be employed.

A method of displaying, on the display unit 14, positional information about an article based on information stored in the database 21, the database 12, the database 13, the database 25, and the map storage unit 26 is described with reference to FIG. 7 and FIGS. 8A and 8B.

Figure 7:
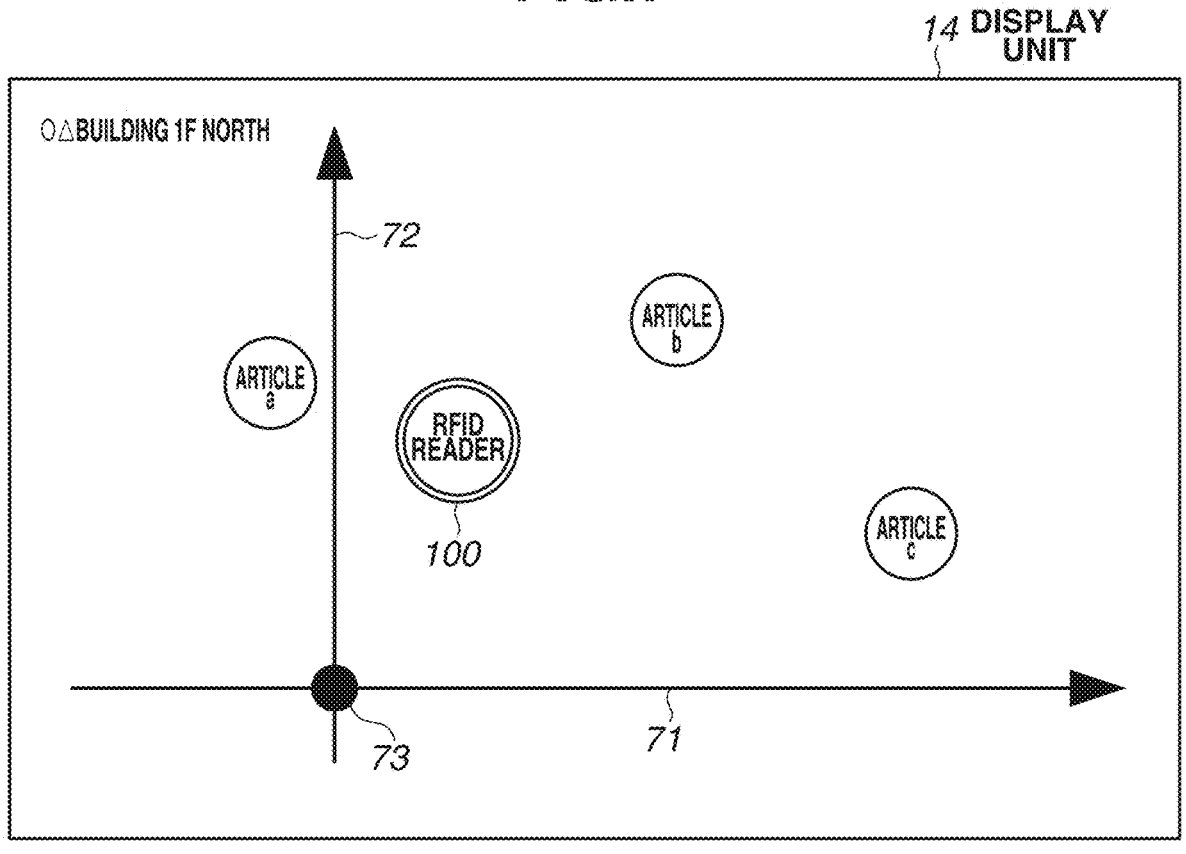
FIG. 7 is a diagram illustrating a display example on the display unit using coordinate axes according to the second exemplary embodiment.

FIG. 7 illustrates an example in which the current position of the RFID reader 100, a detection position of the detected article RFID tag 41, and an X-axis 71 and a Y-axis 72 that are based on a relative coordinate system which is used in the present system are displayed together on the display unit 14. On the display unit 14, the current position of the RFID reader 100 is displayed as a double-line circle, the position of the article RFID tag 41 is displayed as a single-line circle, and the name of an article RFID tag 41 which is referred to from an ID in the database 21 is displayed in the single-line circle.

A point at which the X-axis 71 and the Y-axis 72 intersect with each other means an origin 73 in the relative coordinate system, and is a reference position on the system corresponding to any one of a plurality of pieces of reference position information stored in the database 25. The user is able to select reference position information, which the user wants to use for displaying on the display unit 14, from among a plurality of pieces of reference position information stored in the database 25 via a user interface (not illustrated). Thus, in the second exemplary embodiment, any one of IDs of position RFID tags 42 is selected.

After detecting a position RFID tag 42 corresponding to the selected ID, the present system forms XY coordinate axes with the detection position set as an origin and displays, on the display unit 14, the name of a position RFID tag 42 which is referred to from the ID in the database 21. Before detecting a position RFID tag 42, i.e., when not yet defining the reference position, the present system can be configured not to display various pieces of information, such as XY coordinate axes, on the display unit 14. However, even when not yet determining the reference position, if having already detected an article RFID tag 41, the present system is also able to display, on the display unit 14, only the position of the article RFID tag 41 centering on the RFID reader 100 with use of a method described in the first exemplary embodiment. Then, after detecting a position RFID tag 42 and thus determining the reference position, the present system can change displayed data in such a way as to display various pieces of information such as XY coordinate axes on the display unit 14. Thus, the present system switches between a display method described in the first exemplary embodiment and a display method described in the second exemplary embodiment depending on before or after the reference position is determined. In this case, since it becomes possible to display the latest information on the display unit 14 irrespective of the presence or absence of detection of the position RFID tag 42, user's convenience is improved.

In the second exemplary embodiment, the following description proceeds assuming that a tag which is used as the reference position is determined to be a position RFID tag 42a and is already detected.

Next, a method of displaying the detection position of the article RFID tag 41 on the display unit 14 is described. Here, an article RFID tag 41a is described as a target. As with the method described in the first exemplary embodiment, the method acquires a detection clock time movement amount of the article RFID tag 41a and also acquires a reference movement amount corresponding to the position RFID tag 42a from the database 25. The method calculates a difference between the detection clock time movement amount and the reference movement amount and is thus able to calculate coordinates of the article RFID tag 41a with the position of the position RFID tag 42a set as an origin 73. Then, the method performs appropriate conversion while fitting the calculated coordinates of the article RFID tag 41a to the display coordinate system of the display unit 14 and thus plots a single-line circle image on the display unit 14.

Even in the case of displaying the current position of the RFID reader 100, the method can plot a double-line circle on the display unit 14 based on coordinates obtained by calculating a difference between the current movement amount described in the first exemplary embodiment and the above-mentioned reference movement amount.

Figure 8A:
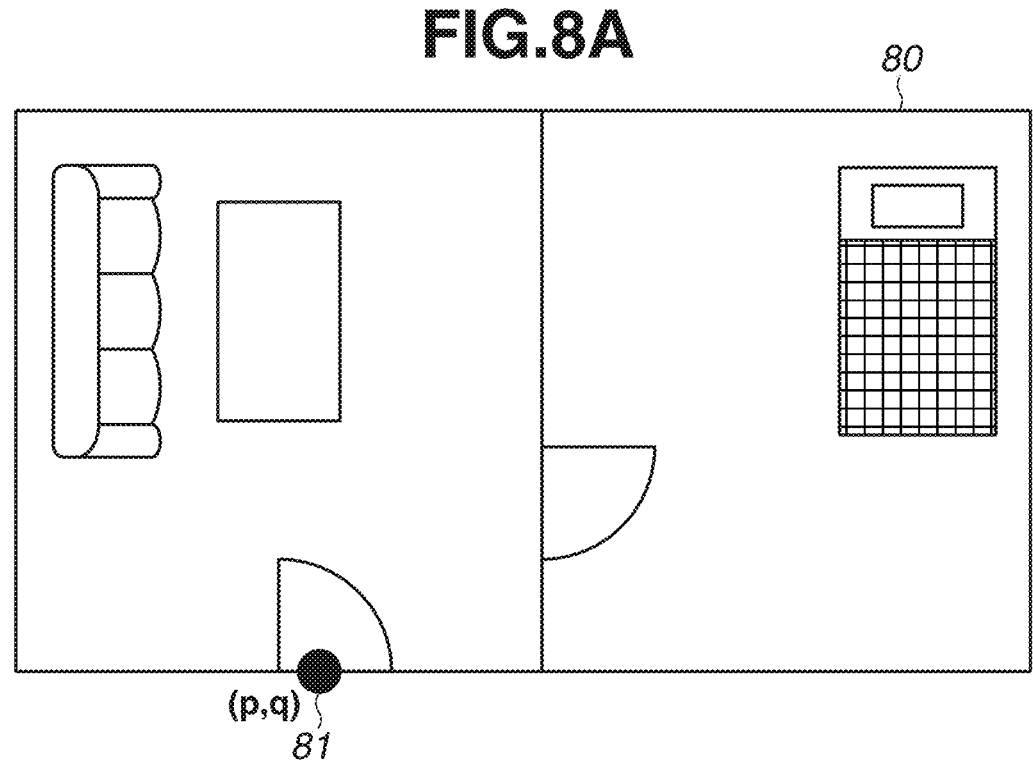
FIGS. 8A and 8B are diagrams illustrating display examples on the display unit using a map according to the second exemplary embodiment.
Figure 8B:
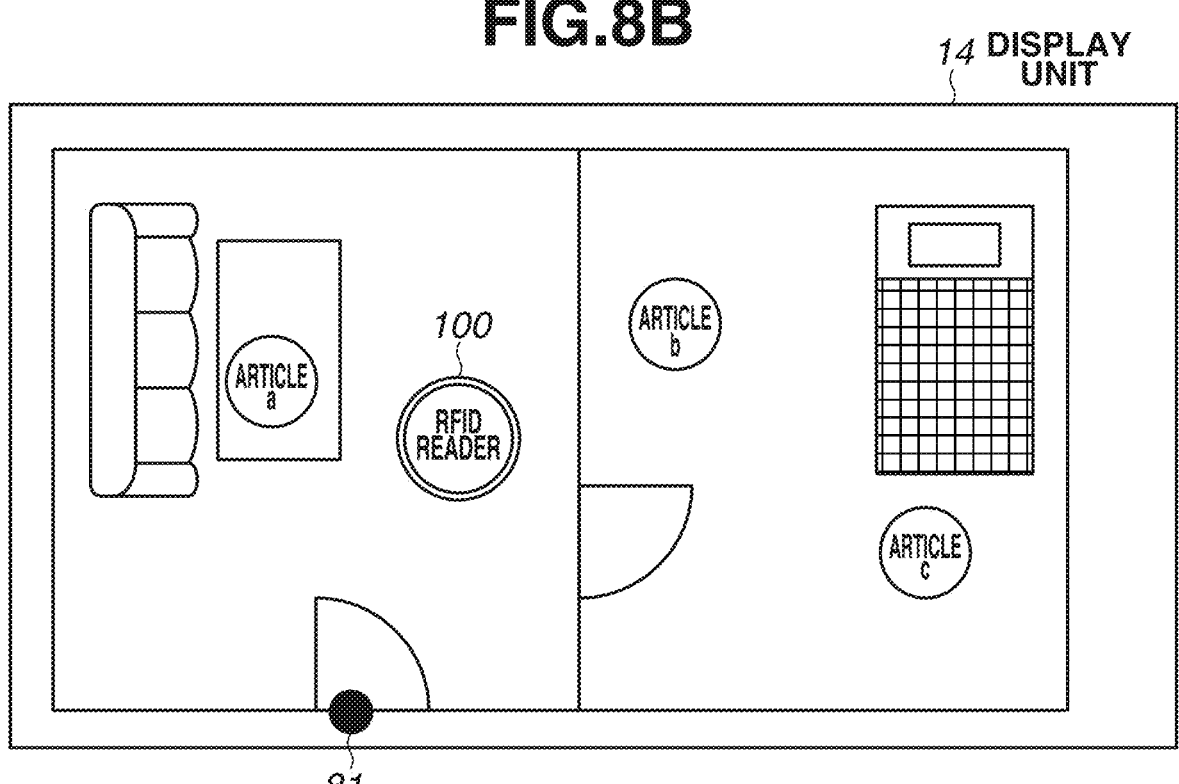

FIGS. 8A and 8B illustrate an example in which the current position of the RFID reader 100, the detection position of the article RFID tag 41, and a map image 80 stored in the map storage unit 26 are displayed together on the display unit 14.

FIG. 8A is a diagram illustrating a map image 80 corresponding to the position RFID tag 42a stored in the map storage unit 26 and an image origin 81 indicated as a filled circle mark on the map image 80. The coordinates of the image origin 81 in the map image 80 are (p, q). The image origin 81 is information indicating where on the map image 80 the above-mentioned origin 73 is present, and thus means that the position RFID tag 42a is present at a position of coordinates (p, q) of the map image 80. FIG. 8B is a diagram illustrating an image displayed on the display unit 14 in such a manner that the origin 73 illustrated in FIG. 7 and the display position of the image origin 81 illustrated in FIG. 8A are fitted to each other on the display unit 14 and the current position of the RFID reader 100 and the detection position of the article RFID tag 41 are superimposed on the map image 80. In a case where the dimension of the map image 80 is different from a corresponding dimension in the display coordinate system of the display unit 14, enlarging or reducing the map image 80 based on the scale information stored in the map storage unit 26 enables performing superimposition of images while maintaining consistency with positional information.

As described above, the reference position being present in the system makes it possible to display the detection position of an article on a map, thus being able to make user's convenience higher than in the first exemplary embodiment.

Furthermore, while, in the second exemplary embodiment, the position RFID tag 42 is used to determine the reference position, the reference position can be designated by any other method. For example, in the case of operating the position detection system 2 with the RFID reader 100 mounted on a robot which performs autonomous running, a method of determining the reference position in the present system is able to be used as a method of detecting a home position which is used for the robot to perform route search. Moreover, even in a case where not a robot but a person carries the RFID reader 100, such a system that, when being in the reference position, the user performs a specific operation to designate the location of the reference position is able to be built out.

Figure 9:
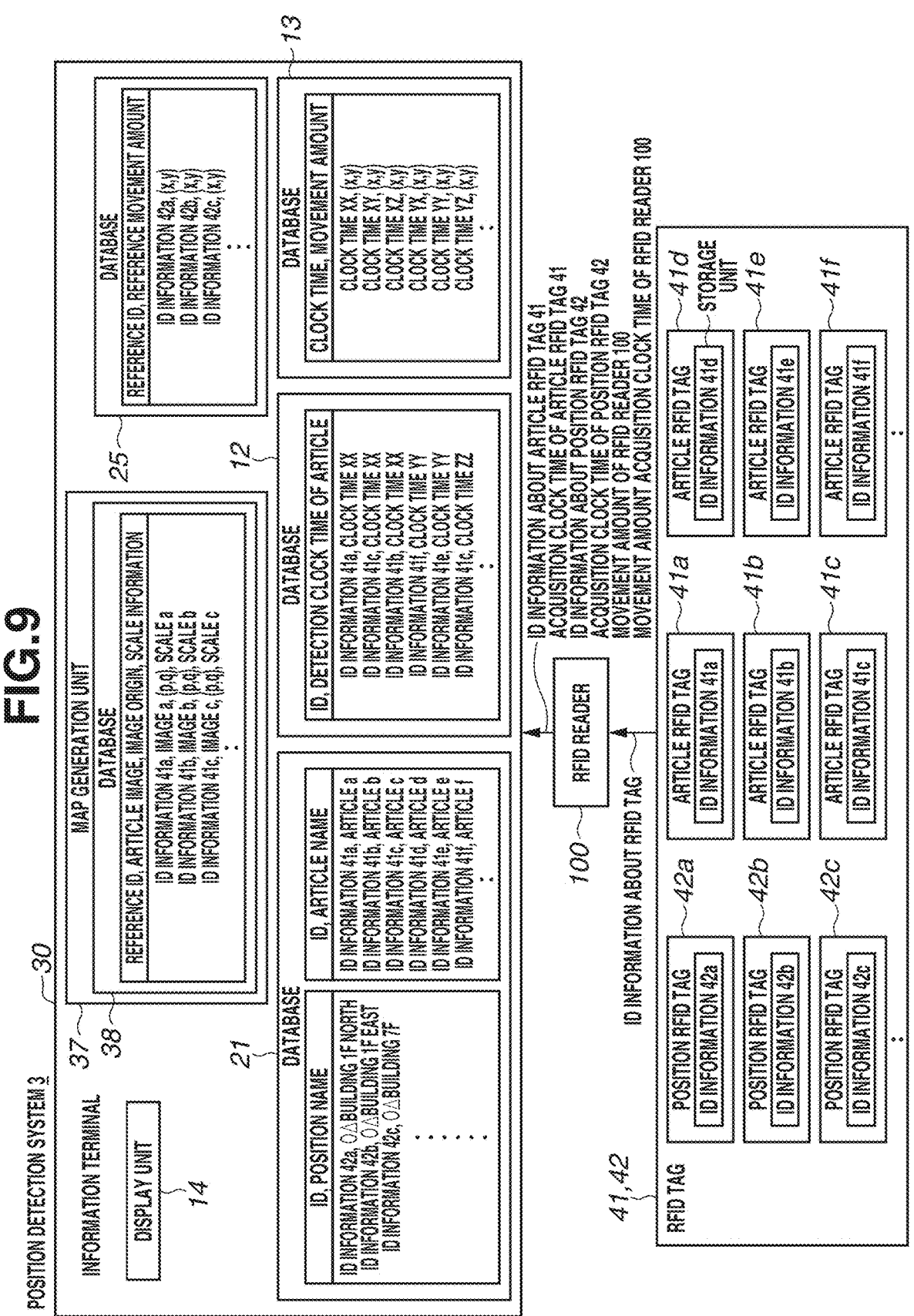
FIG. 9 is a configuration diagram of a position detection system according to a third exemplary embodiment.

FIG. 9 is a configuration diagram of a position detection system 3 in a third exemplary embodiment. The third exemplary embodiment differs from the second exemplary embodiment in that an information terminal 30 includes a map generation unit 37 instead of the map storage unit 26. Furthermore, constituent elements similar to those of the first exemplary embodiment and the second exemplary embodiment are assigned the respective same reference characters as those in the first exemplary embodiment and the second exemplary embodiment and are omitted from description here.

The map generation unit 37 illustrated in FIG. 9 includes an article image storage unit (database) 38, which stores article image information. The article image information is information in which ID information, an article image, an image origin, and scale information are associated with each other. The image origin is similar to the content described with regard to the map storage unit 26 in the second exemplary embodiment, and is, therefore, omitted from description here.

Figure 10A:
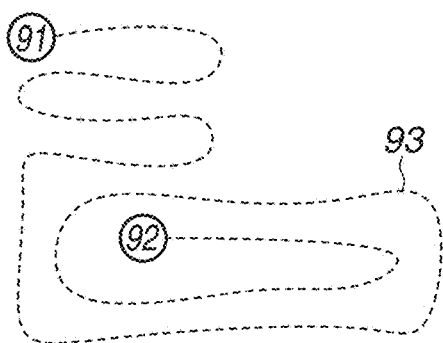
FIGS. 10A, 10B, 10C, and 10D are explanatory diagrams of operations of a map generation unit according to the third exemplary embodiment.

An operation of the map generation unit 37 is described with reference to FIGS. 10A, 10B, 10C, and 10D. FIG. 10A is a diagram illustrating a trajectory of the RFID reader 100. The position 91 indicates a movement start position of the RFID reader 100, the position 92 indicates the current position of the RFID reader 100, and the trajectory 93 drawn with a dashed line indicates a trajectory along which the RFID reader 100 has moved from the position 91 to the position 92. The method of generating the trajectory 93 is similar to that described with reference to FIG. 4B in the first exemplary embodiment, and is, therefore, omitted from description here.

Figure 10B:
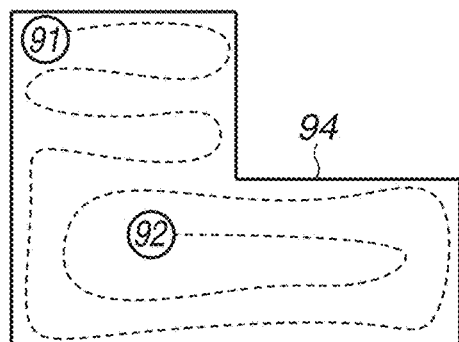

FIG. 10B is a diagram obtained by estimating a floor shape 94 based on the above-mentioned trajectory 93. In the third exemplary embodiment, the movement range of the RFID reader 100 is limited to inside a closed floor. Therefore, the map generation unit 37 generates a minimal floor shape 94 enclosing the trajectory 93 with a combination of rectangular shapes. The generation accuracy of the floor shape 94 becomes higher as the total movement distance of the RFID reader 100 becomes larger.

Figure 10C:
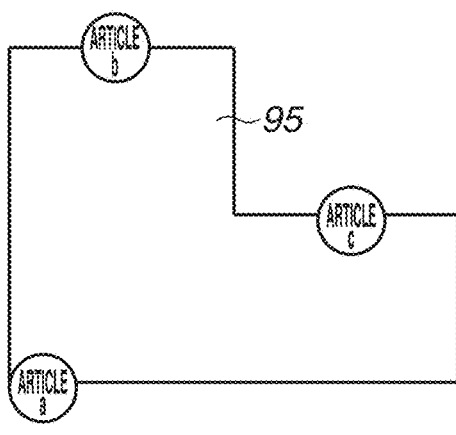

FIG. 10C illustrates a map 95 in which the floor shape 94 and the detection positions of article RFID tags 41 are displayed on the same plane. The location at which the article RFID tag 41 has been detected on the trajectory 93 is displayed as a circle. In the third exemplary embodiment, an article a, an article b, and an article c are illustrated as the names of the detected article RFID tags in FIG. 10C. The method of displaying the article RFID tag 41 is similar to that described in the first exemplary embodiment and the second exemplary embodiment, and is, therefore, omitted from description here.

Figure 10D:
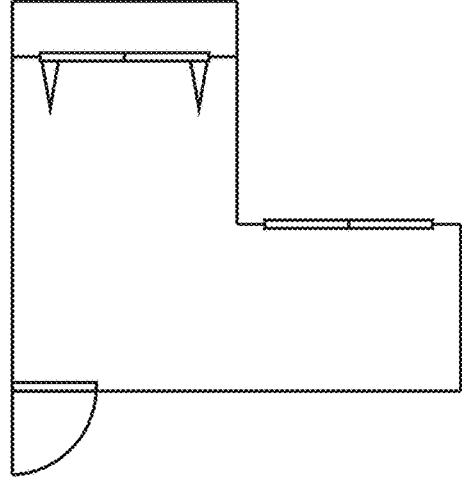

FIG. 10D is a diagram obtained by replacing the article a, the article b, and the article c in the map 95 with article images stored in the database 38. To perform replacement with article images, article image information stored in the database 38 is used. FIG. 11 is a diagram illustrating article images 1001, 1002, and 1003 corresponding to article RFID tags 41*a*, 41*b*, and 41*c* stored in the database 38 and image origins 1011, 1012, and 1013 on the respective article images. The article images 1001, 1002, and 1003 are arranged on the map 95 in such a manner that the image origins 1011, 1012, and 1013 are respectively fitted to the respective detection positions of the article a, the article b, and the article c in the map 95. Moreover, the sizes of the article images 1001, 1002, and 1003 are adjusted based on the above-mentioned scale information about article image information.

As described above, it is possible to provide a method of automatically generating a map indicating the shape of a floor with use of the RFID reader 100 and the detection result of the article RFID tag 41.

Figure 12:
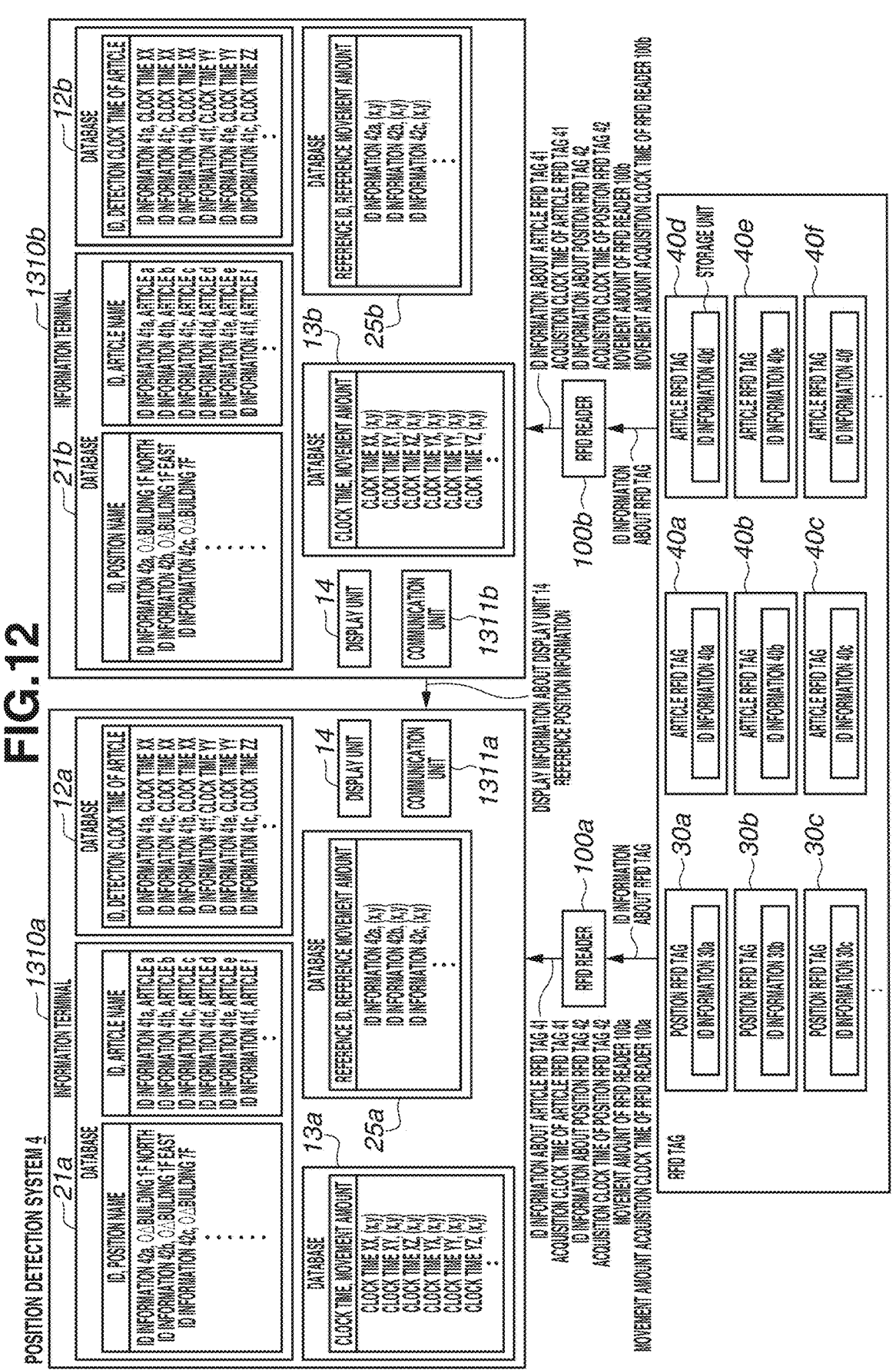
FIG. 12 is a configuration diagram of a position detection system according to a fourth exemplary embodiment.

FIG. 12 is a configuration diagram of a position detection system 4 in a fourth exemplary embodiment. In the fourth exemplary embodiment, a plurality of RFID readers 100 (an RFID reader 100*a* and an RFID reader 100*b*) and a plurality of information terminals 1310 (an information terminal 1310*a* and an information terminal 1310*b*) are used. Moreover, the plurality of information terminals 1310 performs communication with each other. Furthermore, constituent elements similar to those of the second exemplary embodiment are assigned the respective same reference characters as those in the second exemplary embodiment and are omitted from description here.

The functions of the database 21, the database 12, the database 13, and the database 25, which constitute each of the information terminals 1310 are the same as the functions of the elements with the respective same reference characters assigned thereto described in the second exemplary embodiment. Additionally, each of the information terminals 1310 include a communication unit 1311 (a communication unit 1311*a* or a communication unit 1311*b*), and the information terminals 1310 are able to perform transmission and reception of information with each other via wireless communication. In the position detection system 4, the information terminal 1310*b* transmits, to the information terminal 1310*a*, display information for the display unit 14 and reference position information stored in the database 25.

FIG. 13A illustrates an example in which the current position of the RFID reader 100*a*, the detection positions of the detected article RFID tags 41, and an X-axis 1301, a Y-axis 1302, and an origin 1303 that are based on a relative coordinate system which is used in the information terminal 1310*a* are displayed together on a screen 1304.

FIG. 13B illustrates an example in which the current position of the RFID reader 100*b*, the detection positions of the detected article RFID tags 41, and an X-axis 1305, a Y-axis 1306, and an origin 1307 that are based on a relative coordinate system which is used in the information terminal 1310*b* are displayed together on a screen 1308.

In FIG. 13A, the position RFID tag 42*a* is used as the reference position, and, in FIG. 13B, the position RFID tag 42*b* is used as the reference position. Thus, the position of the position RFID tag 42*a* is equivalent to the origin 1303 illustrated in FIG. 13A, and the position of the position RFID tag 42*b* is equivalent to the origin 1307 illustrated in FIG. 13B. The method of generating any other screen is similar to that described in the second exemplary embodiment, and is, therefore, omitted from description here.

In a case where a plurality of users is performing detection of article RFID tags 41 with use of the individual RFID readers 100 and information terminals 1310, the position detection system 4 integrates the contents displayed in the respective information terminals 1310 and provides the integrated contents to the users. In the fourth exemplary embodiment, the information terminal 1310b transmits the image 1308 illustrated in FIG. 13B to the information terminal 1310a and, at the same time, also transmits information indicating that the position RFID tag 42b is used as the reference position. The information terminal 1310a receives the above-mentioned information and calculates a relative positional relationship between the position RFID tag 42a and the position RFID tag 42b. The calculation of the relative positional relationship is able to be performed with use of estimation based on information stored in the database 21. For example, the method previously stores, for example, latitude and longitude information about the position RFID tags 42 as the positions and names stored in the database 21, and then calculates a distance and an angle between the position RFID tags 42.

In FIG. 13C, the method superimposes the image 1308 on the image 1304 in such a manner that a relative positional relationship between the position RFID tag 42a and the position RFID tag 42b and a relative positional relationship between the origin 1303 and the origin 1307, described with reference to FIGS. 13A and 13B, coincide with each other. Then, the method generates an image 1309 in which the X-axis 1305 and the Y-axis 1306 have been deleted and displays the image 1309 on the display unit 14 of the information terminal 1310a.

As described above, since even pieces of information acquired individually by a plurality of apparatuses are able to be integrated into one piece of information by using the reference positions in an appropriate manner, it is possible to extend a system operation region in a wider range as compared with a case where each apparatus is solely operated.

Control of Radiation Directivity of Antenna Unit

FIGS. 14A, 14B, 14C, and 14D illustrate the antenna unit 115, which has a radiation directivity control function, available in each of the above-described exemplary embodiments. A substrate 1101 and a substrate 1102 are arranged to be stacked along the Z-axis, which is a thickness direction of each substrate, and in a −Z direction in the order of the substrate 1101 and the substrate 1102.

Figures 14A, 14B:
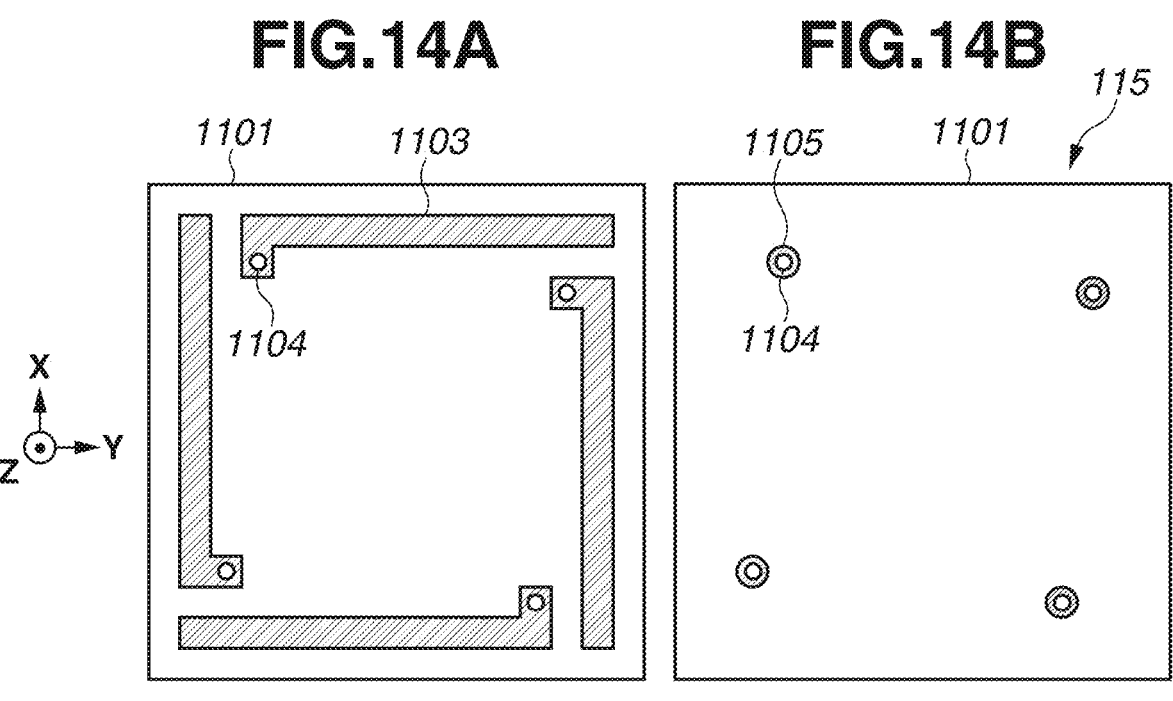
FIGS. 14A, 14B, 14C, and 14D are configuration diagrams of an antenna unit.

FIG. 14A illustrates an obverse surface of the substrate 1101. Four antenna elements 1103 are arranged in such a manner that their extension directions successively differ by 90 degrees from each other along the X-axis and the Y-axis so that their open ends do not overlap each other, and a power feeding end which is an end opposite to each open end is connected to a via 1104. Furthermore, the extension directions of the respective open ends can be an inverse rotational direction, or can be folded back so that the shapes of antenna elements become meandering.

FIG. 14B illustrates a reverse surface of the substrate 1101. Four vias 1104 are respectively connected to four pads 1105 while penetrating through the substrate 1101.

Figures 14C, 14D:
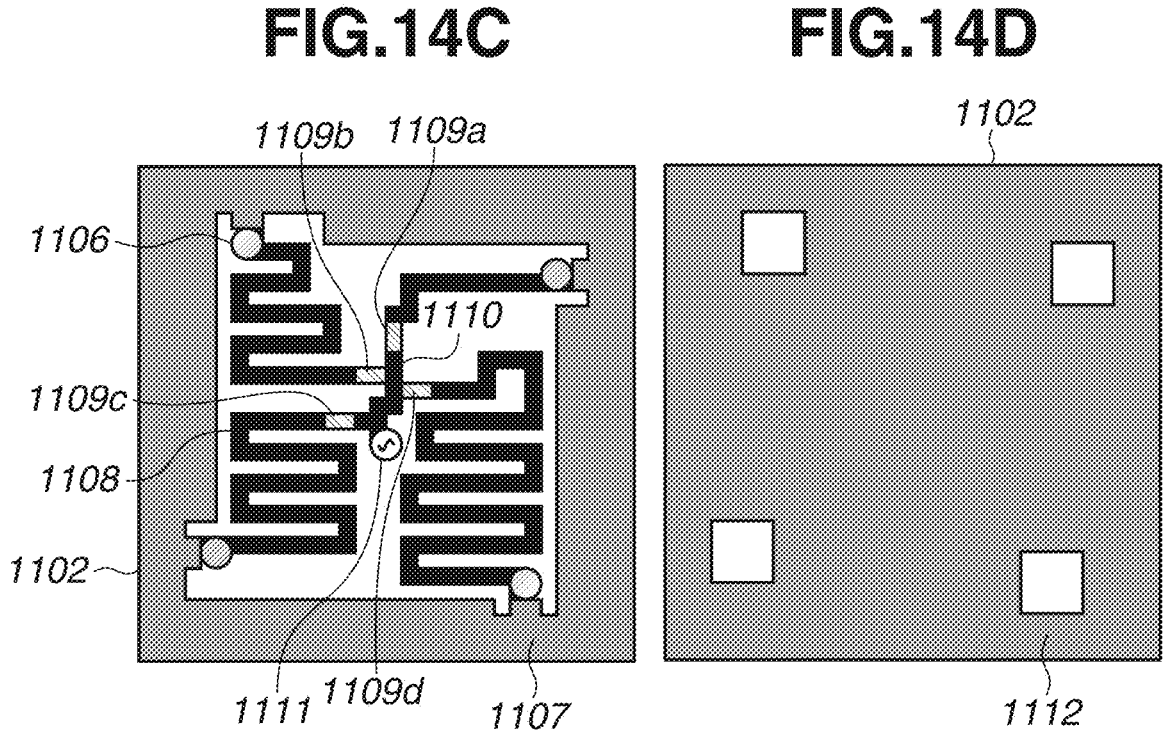

FIG. 14C illustrates an obverse surface of the substrate 1102. Four pads 1106 are connected to a ground 1107 and four radio frequency (RF) lines 1108, respectively. Here, each pad 1105 and each pad 1106 are made conductive with each other by being in surface contact with a metallic spacer which is a conducting portion (not illustrated).

The four RF lines 1108 pass through a common RF line 1110 via four RF switches 1109 (1109a to 1109d) and are connected to a transmission and reception unit 1111 (i.e., the coupler 114).

The RF switch 1109, which has one end connected to the RF line 1108 and the other end connected to the RF line 1110, operates to control whether to make short circuit or open circuit. Therefore, in a case where the RF switch 1109 is in a short-circuit state, an RF signal is able to pass through between the transmission and reception unit 1111 and the antenna element 1103, and, in a case where the RF switch 1109 is in an open-circuit state, an RF signal is not able to pass through between the transmission and reception unit 1111 and the antenna element 1103.

FIG. 14D illustrates a reverse surface of the substrate 1102. A ground 1112 is arranged on the whole reverse surface of the substrate 1102 while avoiding regions overlapping with the pads 1106, and is made conductive with the ground 1107 via a plurality of vias (not illustrated) penetrating through the substrate 1102. Here, the line widths and line thicknesses of the RF line 1108 and the RF line 1110 are determined by a layer structure and permittivity of the substrate 1102 in such a manner that approximately 50 ohms is obtained with respect to the frequency of an RF signal.

Assuming that four pads 1106 are denoted by A, B, C, and D in the order of counterclockwise rotation from the upper left one in FIG. 14C, the respective total electrical lengths of the RF lines interconnecting A, B, C, and D and the transmission and reception unit 1111 are defined as a, b, c, and d.

At this time, the four RF lines 1108 satisfy relationships of $b=a+\lambda/4$, $c=b+\lambda/4$, and $d=c+\lambda/4$, and are arranged in a meandering shape in such a way as not to overlap with the ground 1107. Furthermore, phase differences of the four RF lines 1108 only need to be $\lambda/4$, i.e., approximately 90 degrees, with respect to each other, and, regardless of a rotational direction imparting a phase difference or a mounting method, not using line lengths but using a phase shifter can be employed.

RF signals which are transmitted and received by the antenna unit 115 becomes circularly polarized waves in the case of being combined waves from four antenna elements 1103, and becomes linearly polarized waves in the case of being combined waves from any combination of two opposite antenna elements 1103.

FIGS. 15A, 15B, and 15C illustrate radiation characteristics of an antenna which makes resonance at 920 megahertz (MHz). At this time, with regard to the substrate 1101 and the substrate 1102, the substrate thickness is 1 millimeter (mm), the relative permittivity is 4.3, the interval between the substrate 1101 and the substrate 1102 is 7 mm, and the element length of an inverted-F antenna is about $\lambda/4$. Moreover, the line width of the RF line is 1.6 mm, and the line thickness thereof is 35 micrometers (μm).

FIG. 15A illustrates a radiation characteristic obtained in a case where all of the RF switches 1109a to 1109d have been brought into a short-circuit state, and, in that case, RF signals of circularly polarized waves having a main directivity in the +Z direction are radiated.

FIG. 15B illustrates a radiation characteristic obtained in a case where the RF switches 1109a and 1109c have been brought into a short-circuit state and the RF switches 1109b and 1109d have been brought into an open-circuit state, and, in that case, RF signals of linearly polarized waves are radiated in the +X direction and the –X direction.

FIG. 15C illustrates a radiation characteristic obtained in a case where the RF switches 1109*b* and 1109*d* have been brought into a short-circuit state and the RF switches 1109*a* and 1109*c* have been brought into an open-circuit state, and, in that case, RF signals of linearly polarized waves are radiated in the +Y direction and the –Y direction.

With the above-described configuration, it becomes possible to read RFID tags which have been placed in the X-axis and Y-axis directions which are not able to be read only with RF signals of circularly polarized waves radiating in the +Z direction, by switching directivities. Then, it is possible to detect positional information about articles with an RFID tag attached thereto which are present in a wider range. The RFID reader 100 is characterized in detecting an RFID tag while switching radiation characteristics of the antenna unit 115 between a plurality of directions, and it is favorable that the antenna unit 115 is used for the first to fourth exemplary embodiments. Thus, since it is possible to increase the number of pieces of detection range information available for estimating and calculating the existence probability distributions 62, 63, and 64 of the RFID tags 40 illustrated in FIG. 4D in the first exemplary embodiment, it is possible to further enhance the calculation accuracy of the existence probability distributions 62, 63, and 64.

The above-described first to fourth exemplary embodiments can be implemented by combining some or all of them as appropriate. For example, a configuration in which display forms of positional information about an article described in each exemplary embodiment are set as display modes and these display modes can be switched by a user operation can be employed. Alternatively, a configuration in which an information terminal automatically selects and executes an appropriate display form according to the content of information which has been able to be acquired from the RFID reader.

Various embodiments of the present disclosure can be implemented by performing processing for supplying a program for implementing one or more functions of at least one of the above-described exemplary embodiments to a system or apparatus via a network or a storage medium and causing one or more processors in a computer of the system or apparatus to read out and execute the program. Moreover, various embodiments of the present disclosure can be implemented by using a circuit which implements one or more of the functions of at least one of the above-described exemplary embodiments (for example, an application specific integrated circuit (ASIC)).

According to exemplary embodiments of the present disclosure described herein, it becomes possible to display positional information about a wireless device which is away in distance from a detection apparatus which detects wireless devices.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
   a power supply;
   a detection sensor configured to detect a first wireless device and a second wireless device;
   an acquiring unit configured to store
      identification information about the first wireless device and the second wireless device;
      detection time information when detected for the first wireless device and the second wireless device, and
      a movement amount of the information processing apparatus together with the corresponding movement measurement time information;
   an estimation unit configured to estimate a position of the information processing apparatus and a position of the second wireless device based on the identification information, the detection time information and the movement measurement time information;
   a determination unit configured to determine a reference position; and
   a controller configured to cause a display unit to display the position of the information processing apparatus and position information of the second wireless device,
   wherein the first wireless device is a wireless device for indicating the reference position,
   wherein the determination unit determines
      the reference position of the first wireless device to be used for display on the display unit and
      a relative position of the second wireless device with respect to the first wireless device using the detection time information and the identification information relating to the second wireless device, and
   wherein the controller controls to display the position information of the second wireless device on the display unit based on the reference position determined by the determination unit.

2. The information processing apparatus according to claim 1, wherein the information processing apparatus is a radio frequency identification (RFID) reader, and the first wireless device and the second wireless device are RFID tags; and wherein the detection sensor detects the first wireless device and the second wireless device by reading the identification information of the RFID tags of the first wireless device and the second wireless device.

3. The information processing apparatus according to claim 1, wherein the detection sensor detects the first wireless device and the second wireless device by using an antenna capable of switching a radio wave radiation directivity.

4. The information processing apparatus according to claim 1, wherein the controller controls to update the position information displayed on the display unit each time the relative position is changed.

5. The information processing apparatus according to claim 1, wherein the controller controls the display unit provided in a location information processing device to display the information.

6. The information processing apparatus according to claim 1, wherein the display unit is provided in a display device that is separate from the information processing apparatus.

* * * * *